United States Patent
Nishino et al.

(10) Patent No.: US 8,873,073 B2
(45) Date of Patent: Oct. 28, 2014

(54) INFORMATION PROCESSING DEVICE, COMPUTER-READABLE RECORDING MEDIUM ON WHICH OPERATIONAL CONTROL PROGRAM IS RECORDED, ELECTRICAL DEVICE, AND OPERATIONAL CONTROL SYSTEM

(75) Inventors: Tetsuya Nishino, Osaka (JP); Masaki Sone, Osaka (JP)

(73) Assignee: Kyocera Mita Corporation, Osaka-shi (JP)

( * ) Notice: Subject to any disclaimer, the term of this patent is extended or adjusted under 35 U.S.C. 154(b) by 856 days.

(21) Appl. No.: 12/912,822

(22) Filed: Oct. 27, 2010

(65) Prior Publication Data
US 2011/0102827 A1   May 5, 2011

(30) Foreign Application Priority Data

Oct. 30, 2009 (JP) .................................. 2009-250936
Oct. 30, 2009 (JP) .................................. 2009-250937
Oct. 30, 2009 (JP) .................................. 2009-250938

(51) Int. Cl.
*G06F 3/12* (2006.01)
*H04N 1/00* (2006.01)

(52) U.S. Cl.
CPC ....... *H04N 1/00222* (2013.01); *H04N 1/00244* (2013.01); *H04N 1/00413* (2013.01); *H04N 2201/3212* (2013.01); *H04N 2201/3214* (2013.01); *H04N 2201/3221* (2013.01); *H04N 2201/3222* (2013.01); *H04N 2201/3223* (2013.01)
USPC ........................... 358/1.13; 358/1.15; 358/1.1

(58) Field of Classification Search
None
See application file for complete search history.

(56) References Cited

U.S. PATENT DOCUMENTS

| | | | | |
|---|---|---|---|---|
| 5,367,626 | A * | 11/1994 | Morioka et al. | 715/837 |
| 5,559,948 | A * | 9/1996 | Bloomfield et al. | 715/835 |
| 6,348,971 | B2 * | 2/2002 | Owa et al. | 358/1.15 |
| 8,184,311 | B2 * | 5/2012 | Sakai | 358/1.15 |
| 8,245,149 | B2 * | 8/2012 | Ito | 715/769 |
| 8,264,711 | B2 * | 9/2012 | Takahashi | 358/1.15 |

(Continued)

FOREIGN PATENT DOCUMENTS

| | | |
|---|---|---|
| CN | 1794104 | 6/2006 |
| JP | 2004-334531 | 11/2004 |
| JP | 2006-166292 | 6/2006 |
| JP | 2007-232908 | 9/2007 |

OTHER PUBLICATIONS

Chinese Office Action of Nov. 30, 2012.

*Primary Examiner* — Marcus T Riley
(74) *Attorney, Agent, or Firm* — Gerald E. Hespos; Michael J. Porco; Matthew T. Hespos

(57) ABSTRACT

An information processing device has a parts selection instruction receiving portion that receives from an operator a selection instruction of display object parts to be displayed on a screen for receiving an instruction from an operator. A job selection instruction receiving portion receives from an operator a selection instruction of a job that is executable by an electrical device and is associated with the display object parts indicated by the display object parts selection instruction. An external service selection instruction receiving portion receives from an operator a selection instruction of a service executable by an external device other than the electrical device and associated with the display object parts indicated by the display object parts selection instruction. A screen data generation portion generates screen data of the display screen based on content determined by the parts selection instruction, the job selection instruction, and the service selection instruction.

1 Claim, 14 Drawing Sheets

(56) References Cited

U.S. PATENT DOCUMENTS

| | | | |
|---|---|---|---|
| 8,335,002 B2 * | 12/2012 | Kawara | 358/1.15 |
| 8,339,645 B2 * | 12/2012 | Nakawaki | 358/1.15 |
| 8,370,373 B2 * | 2/2013 | Yamamoto | 707/758 |
| 8,385,715 B2 * | 2/2013 | Oyama | 386/224 |
| 2002/0021310 A1 * | 2/2002 | Nakai et al. | 345/837 |
| 2004/0223060 A1 | 11/2004 | Yasuda | |
| 2005/0105129 A1 * | 5/2005 | Takahashi | 358/1.15 |
| 2005/0207776 A1 * | 9/2005 | Nomura et al. | 399/79 |
| 2006/0101343 A1 | 5/2006 | Machida | |
| 2006/0136488 A1 | 6/2006 | Mifune et al. | |
| 2007/0064253 A1 * | 3/2007 | Yang | 358/1.13 |
| 2007/0171450 A1 * | 7/2007 | Yoshida | 358/1.13 |
| 2007/0189729 A1 * | 8/2007 | Oyama | 386/107 |
| 2007/0220359 A1 | 9/2007 | Mochizuki | |
| 2007/0236730 A1 | 10/2007 | Takeuchi et al. | |
| 2007/0268517 A1 | 11/2007 | Koarai | |
| 2008/0024818 A1 * | 1/2008 | Ito | 358/1.15 |
| 2009/0051963 A1 * | 2/2009 | Igarashi | 358/1.15 |
| 2009/0091776 A1 * | 4/2009 | Kobayashi et al. | 358/1.13 |
| 2009/0161158 A1 * | 6/2009 | Fujikawa | 358/1.15 |
| 2009/0237728 A1 * | 9/2009 | Yamamoto | 358/1.15 |
| 2009/0268239 A1 * | 10/2009 | Kawara | 358/1.15 |
| 2009/0284785 A1 * | 11/2009 | Bando | 358/1.15 |
| 2009/0296146 A1 * | 12/2009 | Nakawaki | 358/1.15 |
| 2009/0310183 A1 * | 12/2009 | Sone et al. | 358/1.18 |
| 2009/0323096 A1 * | 12/2009 | Oshima | 358/1.13 |
| 2010/0079803 A1 * | 4/2010 | Takeya | 358/1.15 |
| 2010/0082709 A1 * | 4/2010 | Yamamoto | 707/812 |

\* cited by examiner

INFORMATION PROCESSING DEVICE, COMPUTER-READABLE RECORDING MEDIUM ON WHICH OPERATIONAL CONTROL PROGRAM IS RECORDED, ELECTRICAL DEVICE, AND OPERATIONAL CONTROL SYSTEM

BACKGROUND OF THE INVENTION

1. Field of the Invention

The present invention relates to electrical devices and technology for causing external devices connected to these electrical devices to carry out predetermined operations on.

2. Description of the Related Art

Hitherto, in electrical devices such as image forming apparatuses in which an instruction is received from an operator to carry out an operation or the like indicated by that instruction, technologies have been employed in which a display portion is provided constituted by an LCD (liquid crystal display) or the like on an operation panel on a front surface of the apparatus, and instructions to execute operations corresponding to operation buttons on a display screen, which is displayed on the display portion, are received from an operator using a touch panel function, which is arranged on the display portion. In these image forming apparatuses, operation by the operator based on the display screen on the display portion of that image forming apparatus targets only that image forming apparatus for the operational control based on that operation.

SUMMARY OF THE INVENTION

The present invention further improves operator convenience compared to the above-mentioned conventional inventions.

That is, the present invention includes an information processing device that generates screen data of a display screen to be displayed on a display portion provided in an electrical device, and is provided with: a parts selection instruction receiving portion that receives from an operator a selection instruction for display object parts to be displayed on a display screen of the display portion for receiving an instruction from an operator, a job selection instruction receiving portion that receives from an operator a selection instruction of a job that is executable by the electrical device and that is associated with the display object parts indicated by the display object parts selection instruction received by the parts selection instruction receiving portion, an external service selection instruction receiving portion that receives from an operator a selection instruction of a service that is executable by an external device other than the electrical device and that is associated with the display object parts indicated by the display object parts selection instruction received by the parts selection instruction receiving portion, and a screen data generation portion that generates screen data of the display screen, on a basis content determined according to a parts selection instruction received by the parts selection instruction receiving portion, a job selection instruction received by the job selection instruction receiving portion, and a service selection instruction received by the external service selection instruction receiving portion.

DETAILED DESCRIPTION OF THE PREFERRED EMBODIMENTS

Hereinafter description is given regarding an operational control system, an information processing device, an electrical device, a display screen generation program, and an operational control program according to one embodiment of the present invention with reference to the accompanying drawings.

Figure 1:
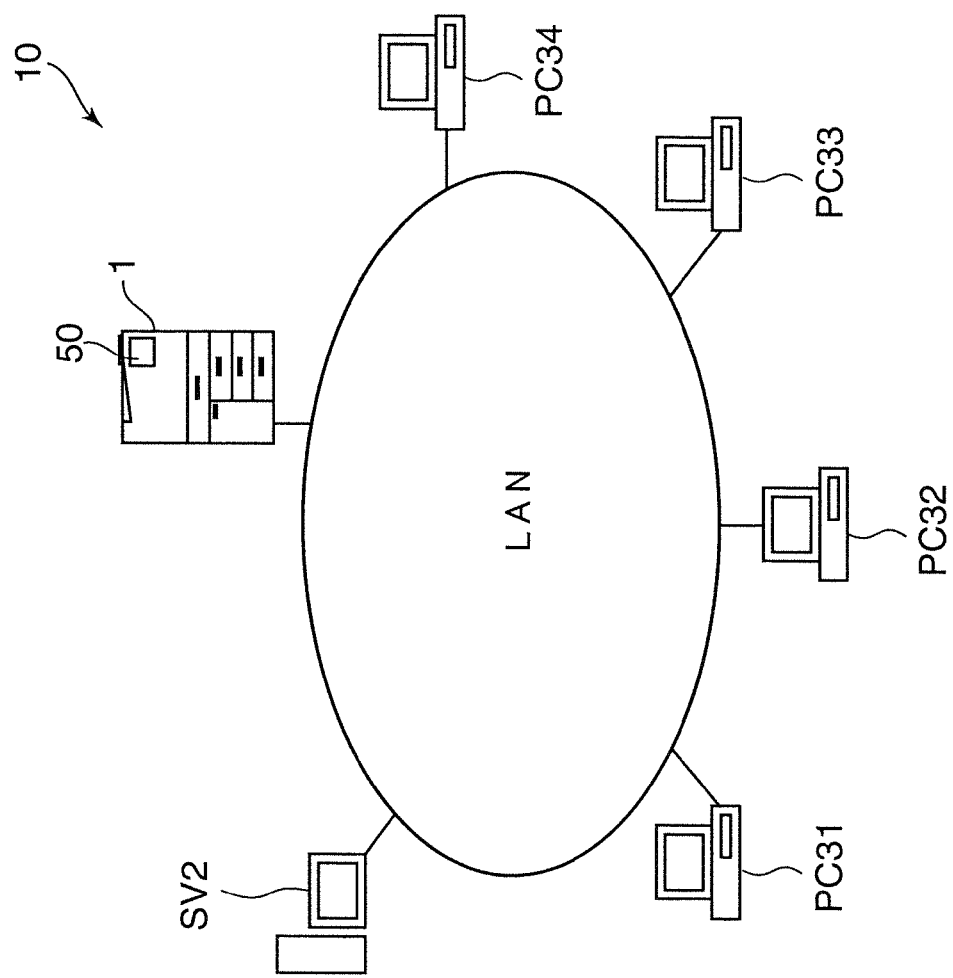
FIG. 1 is a diagram showing a first embodiment of an operational control system according to one embodiment of the present invention.

FIG. 1 is a diagram showing a first embodiment of an operational control system according to one embodiment of the present invention. An operational control system 10 is constituted by a multifunction peripheral 1, a server computer SV2, and various personal computers (hereinafter, PCs) 31 to 34. However, the numbers of copiers, server computers, and PCs provided in the operational control system 10 are not limited to these.

The multifunction peripheral 1, which is one example of an electrical device and an image forming apparatus, is provided with a combination of functions such as a copy function, a fax function, a printer function, and a scanner function. Further still, the multifunction peripheral 1 is provided with a document management function in which, for example, document data of an original read by a scanner portion is stored in an internal storage device of the multifunction peripheral 1 or a storage device or the like inside the server computer SV2 or the PCs 31 to 34 connected by a network to the multifunction peripheral 1 using a LAN (local area network) or the like, and data targeted for printing that is stored in the internal storage device of the multifunction peripheral 1 and the storage devices inside the server computer SV2 and the PCs 31 to 34 is read out and printed.

Further still, a display portion 50 constituted by an LCD (liquid crystal display) is provided in the multifunction peripheral 1. Furthermore, the server computer SV2 is capable of generating screen data of display screens (hereinafter referred to as screen data) to be displayed on the display portion 50 of the multifunction peripheral 1. The multifunction peripheral 1 receives from the server computer SV2 the screen data for displaying display screens on the display portion 50, and displays this screen data on the display portion 50. Alternatively, the multifunction peripheral 1 itself possesses screen data for displaying display screens on the display portion 50, and uses this screen data to perform display on the display portion 50. Generation of the aforementioned screen data by the operational control system 10, screen displays on the multifunction peripheral 1, and a configuration and processes for operational control of the multifunction peripheral 1 and the like are described later.

Figure 2:
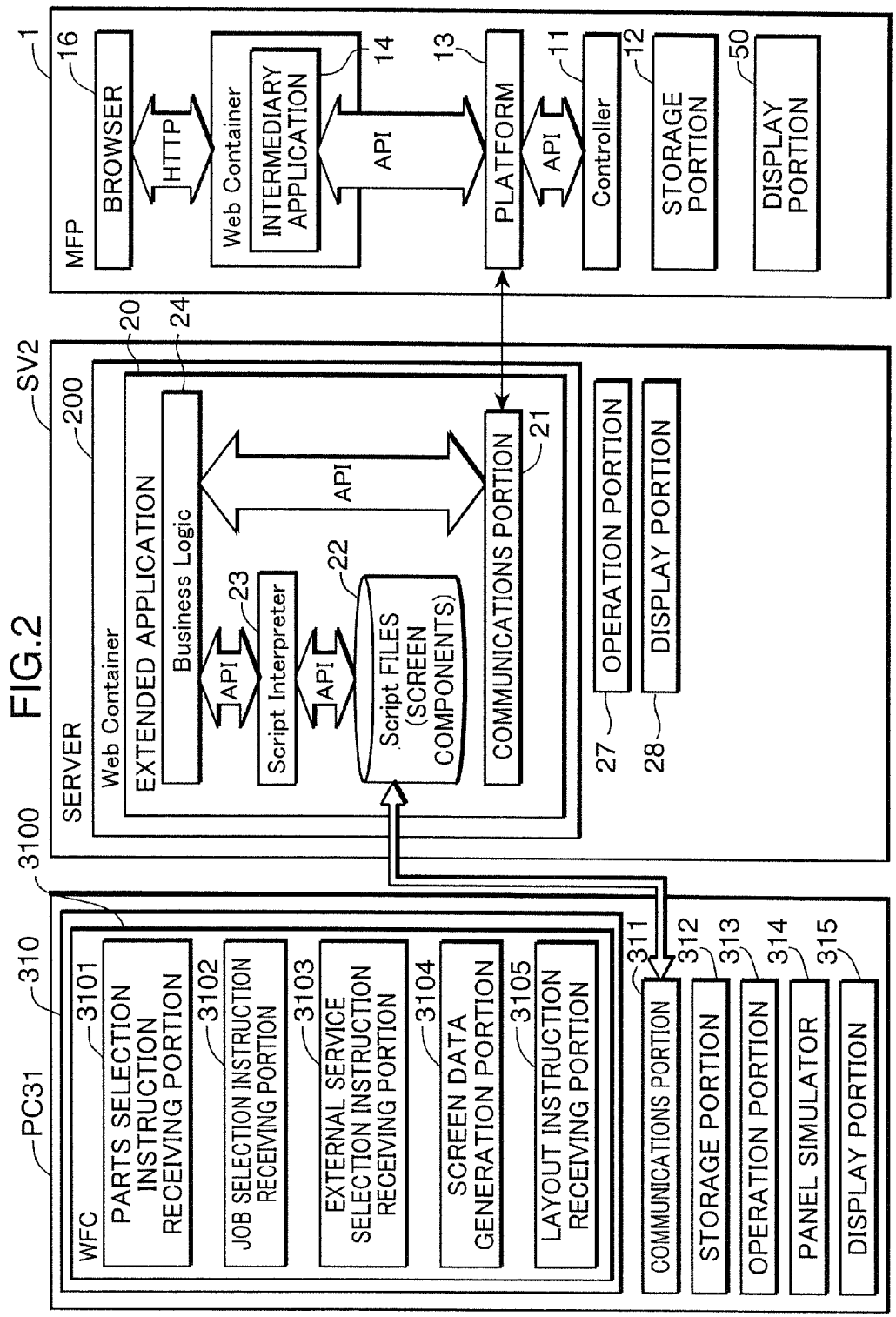
FIG. 2 is a diagram showing a configuration required in image data generation processing, screen display, and operational control, in regard to a server computer, a PC, and a multifunction peripheral of the operational control system according to the first embodiment.

Next, description is given of a configuration required in image data generation processing, screen display, and operational control, which is an internal configuration of the server computer SV2, the PCs 31 to 34, and the multifunction peripheral 1. FIG. 2 is a diagram showing a configuration required in image data generation processing, screen display, and operational control, in regard to a server computer, a PC, and a multifunction peripheral of an operational control system 10 according to the first embodiment. It should be noted that the configuration required in display screen generation processing is the same the PCs 31 to 34, and therefore the configuration of the PC 31 is shown in FIG. 2.

The PC 31 is provided with a control portion 310, a storage portion 312, and a display portion 315.

The storage portion 312 is constituted by an HDD or the like, and stores a display screen generation program for carrying out display screen generation in the PC 31. For example, the display screen generation program is recorded in a computer-readable recording medium, and an unshown interface provided in the PC 31 reads out the display screen generation program from the recording medium, and stores the display screen generation program in the storage portion 312.

The control portion 310 is constituted by a CPU or the like and administers the overall operational control of the PC 31, and functions as a workflow creator portion (hereinafter, WFC portion) 3100 by operating in accordance with the display screen generation program stored in the storage portion 312. The WFC portion 3100 is a tool that generates screen data of the display screens to be displayed on the display portion 50 of the multifunction peripheral 1 in an XML (extensible markup language) data format for example. The WFC portion 3100 carries out processing in which customization of the display object parts such as various buttons and the like that constitute the display screens is received from the operator to generate display screens.

The WFC portion 3100 functions as a parts selection instruction receiving portion 3101, a job selection instruction receiving portion 3102, external service selection instruction receiving portion 3103, a screen data generation portion 3104, and a layout instruction receiving portion 3105.

The parts selection instruction receiving portion 3101 receives from the operator a parts selection instruction, which selects display object parts to be displayed in display screens of the display portion 50 of the multifunction peripheral 1. The parts selection instruction receiving portion 3101 receives from the operator through an operation portion 313 (a mouse or keyboard and the like) a selection of display object parts such operation buttons, icons, and character strings for example, which are displayed for receiving instructions from the operator within the display screens. The screen data of multiple display object parts selectable by the operator is stored by the WFC portion 3100. For example, when an activation instruction of the WFC portion 3100 is received via the operation portion 313 by an operation of the operation portion 313 by the operator, the parts selection instruction receiving portion 3101 displays a customization receiving screen on the display portion 315. The display object parts are displayed in the customization receiving screen, and when display object parts desired by the operator from the display object parts being displayed are specified by the operator by operating the operation portion, the parts selection instruction receiving portion 3101 receives the specified selection of display object parts.

The job selection instruction receiving portion 3102 receives from the operator through the operation portion 313 a selection display of jobs executable by the multifunction peripheral 1 associated with the display object parts indicated by the display object parts received by the parts selection instruction receiving portion 3101. Here, job for example refers to jobs for executing a scanning operation, printing operation, copying operation, or faxing operation executable by the multifunction peripheral 1, operational settings regarding each of these operations, display screen switching control of the display portion 50, and various operations such as authentication of operator identifying information (an operator ID or the like) inputted by the operator. However, this is not intended to limit these jobs to this type of content. The multiple jobs selectable by the user through the job selection instruction receiving portion 3102 are stored in the WFC portion 3100.

The external service selection instruction receiving portion 3103 receives from the operator through the operation portion 313 a selection display of services executable by external devices (for example, peripheral devices such as a personal computer connected by a network to the multifunction peripheral 1, or the PCs 31 to 34) other than the multifunction peripheral 1 associated with the display object parts with regard to the display object parts indicated by the parts selection instruction received by the parts selection instruction receiving portion 3101. These services refer to jobs (here, jobs of external devices are referred to as services to distinguish them from jobs of the multifunction peripheral 1) for executing various operations such as image processing, data upload processing, data storage processing, printing operations, operational settings related to these operations, and data conversion processing (OCR processing) and the like that are executable by the external devices. However, this is not intended to limit these services to this type of content. The multiple services that can be specified by the operator are stored by the WFC portion 3100.

It should be noted that it is possible, in regard to a single display object part that indicates a parts selection instruction received by the parts selection instruction receiving portion 3101, to (1) associate any single job or service using the job selection instruction receiving portion 3102 or the external service selection instruction receiving portion 3103, and to (2) associate multiple jobs and services (both jobs and services are also possible) using the job selection instruction receiving portion 3102 or the external service selection instruction receiving portion 3103.

The layout instruction receiving portion 3105 receives through the operation portion 313 from the operator a layout instruction that instructs, arrangement, within the display screens, of the display object parts received by the parts selection instruction receiving portion 3101. For example, the layout instruction receiving portion 3105 uses background image data (stored in the WFC portion 3100) of the aforementioned display screen to display the background image of display screen on the display portion 315 in a simulated manner, and when an arbitrary location on this background image is specified by the operator using the operation portion 313, the layout instruction receiving portion 3105 receives the specified location as an arrangement position of the specified display object part.

The screen data generation portion 3104 generates screen data of the display screen, for example in an XML format, to be displayed on the display portion 50 of the multifunction peripheral 1 using content that is determined according to the parts selection instruction received by the parts selection instruction receiving portion 3101, the job selection instruction received by the job selection instruction receiving portion 3102, the service selection instruction received by the external service selection instruction receiving portion 3103, and the layout instruction received by the layout instruction receiving portion 3105.

Furthermore, the screen data generation portion 3104 stores the generated screen data in the storage portion 312. That is, when the operator carries out operations of inputting the aforementioned parts selection instruction, job selection instruction, service selection instruction, and layout instruction, the display screens to be displayed on the display portion 50 of the multifunction peripheral 1 can be customized as desired and generated according to display screen generation processing by the screen data generation portion 3104. In the present embodiment, the screen data generation portion 3104 exports the screen data in a script file in XML format. It should be noted that although an XML format script file is used as the data file of the display screens in the present embodiment, different markup languages other than the XML format may be used in the system configuration.

It should be noted that in order to cause predetermined operations to be carried out in the multifunction peripheral 1 or an external device other than the multifunction peripheral 1, the generated screen data can also be construed as an operational control program that cause the server computer SV2 connected to the multifunction peripheral 1, or the server computer SV2 connected to the multifunction peripheral 1 and the external devices, to achieve a predetermined function. It should be noted that this operational control program may be recorded in a computer-readable recording medium, and an unshown interface provided in the multifunction peripheral 1 or the server computer SV2 may read out the operational control program from the recording medium, and store the operational control program in the storage portion of the multifunction peripheral 1 or the server computer SV2.

That is, when the aforementioned generated screen data is stored in the multifunction peripheral 1 or the server computer SV2, the aforementioned generated screen data fulfills a role of (1) a display data storage portion storing display data that is generated using content constituted by display object parts to be displayed on the display portion 50 of the multifunction peripheral 1 for receiving instructions from the operator, jobs executable by the multifunction peripheral 1 associated with the display object parts, and services executable by the aforementioned external devices associated with the display object parts, as screen data for performing display on the display portion 50, and (2) a response portion that, in accordance with an inquiry in which display object parts are specified, responds with jobs and services associated with the display object parts that are an object of that inquiry based on the display data stored in the display data storage portion. Therefore the generated screen data works as an operational control program that causes the multifunction peripheral 1 or the server computer SV2 to function as the display data storage portion and the response portion.

The operation portion 313 is constituted by a mouse pointer or a keyboard and the like, and receives various instructions from the operator through operations of the operator.

A communications portion 311 is an interface that carries out input and output of data between the PC 31 and at least the server computer SV2 via a network. Under instruction from the screen data generation portion 3104 for example, the communications portion 311 outputs to the server computer SV2 screen data that has been read out from the storage portion 312 by the screen data generation portion 3104.

The display portion 315 is constituted by an LCD (liquid crystal display) and displays various images in accordance with display control by the control portion 310.

A panel simulator 314 is a tool that analyzes the content of the screen data, which is constituted by the aforementioned script files exported by the WFC portion 3100, and converts this screen data to HTML format data so as to be displayable by the display portion 315.

Furthermore, the server computer SV2 is provided with a control unit 200 constituted by a CPU or the like and a storage portion 22 constituted by an HDD or the like, and through these an extended application 20 is achieved, which is a necessary component as one embodiment of the present invention.

The extended application 20 is principally provided with a communications portion 21, a storage portion 22, a script interpreter 23, and a business logic 24.

The extended application 20 is an application capable of installed as a subsequent addition to the server computer SV2.

The storage portion (screen data storage portion) 22 stores the operational control program and the like of the server computer SV2 according to one embodiment of the present invention. Furthermore, the storage portion 22 also stores screen data (operational control program) that is generated in the PC 31 and transmitted from the PC 31. The CPU, which is the central control portion of the server computer SV2, functions as the extended application 20 by operating in accordance with the programs stored in the storage portion 22.

The communications portion 21 is an interface that carries out input and output of data via the network between the PC 31, the multifunction peripheral 1, and the external devices. The communications portion (a screen data output portion and a parts specification instruction receiving portion) 21 carries out transceiving via the LAN or the like of the aforementioned instructions and screen data and the like with the PC 31 and the like, and transceiving of screen data, control commands, and button specification information and the like obtained from the business logic 24 between itself and the multifunction peripheral 1.

The script interpreter (data conversion portion) 23 carries out a data conversion process of converting screen data read out from the storage portion 22 to data displayable by the display portion 50 of the multifunction peripheral 1, for example, HTML format, in accordance with the output instructions of screen data transmitted from the multifunction peripheral 1, and an expansion process to the business logic 24 for executing actions (the aforementioned jobs and services) associated with the display object parts of operation buttons and the like placed within the display screen. The script interpreter 23 transfers the data, on which the conversion process to HTML format was carried out for display, to the business logic 24 via an API.

The business logic 24 transmits the data on which the HTML conversion process was carried out for display to a platform 13 of the multifunction peripheral 1 via the communications portion 21. Furthermore, the business logic 24 controls the actions of the multifunction peripheral 1 (operations of the multifunction peripheral 1) based on information (information indicating the jobs of the multifunction peripheral 1 and services of the external devices associated with the display object parts) obtained from the aforementioned script interpreter 23.

That is, when display object parts such as operation buttons or the like displayed on the display screen being displayed on the display portion 50 are specified by the operator through a web browser 16 of the multifunction peripheral 1, the business logic (analysis portion) 24 obtains from the multifunction peripheral 1 via the communications portion 21 a parts specification instruction of which display object parts have been specified, and analyzes the jobs and services that have been set by the display object parts indicated by the parts specification instruction based on the aforementioned information transferred from the script interpreter 23. Then, in order to execute the analyzed jobs and services, the business logic 24 calls the API corresponding to the analyzed jobs and services. That is, the business logic 24 generates control commands for executing the analyzed jobs and services on the multifunction peripheral 1 or the external device. For example, in a case where the analyzed job is a scanner function, the business logic 24 calls a scanner transmission API as a control command for executing a scanner function on the multifunction peripheral 1. For example, in a case where the analyzed service is image processing or the like of redeye removal processing of image data, the business logic 24 calls an API of redeye removal processing or the like as a control command for executing redeye removal processing or the like on the external device.

That is, in a case where a parts specification instruction indicating display object parts that have been specified by the operator at the multifunction peripheral 1 are received from the multifunction peripheral 1 by the communications portion 21 (parts specification instruction receiving portion), the business logic (analysis portion) 24 analyzes the jobs of the multifunction peripheral 1 and the services of the external devices associated with display object parts indicated by the parts specification instruction that has been received via the script interpreter 23 based on a correspondence relationship of the display object parts, jobs, and services indicated by the screen data stored in the storage portion 22. At this time, in regard to the screen data stored in the storage portion 22, in response to the inquiry in which display object parts from the business logic 24 and the script interpreter 23 are specified, a response is made to the business logic 24 of jobs and services associated with the display object parts that are the object of the inquiry. The business logic 24 transmits jobs obtained by this analysis from the communications portion (output portion) 21 to the multifunction peripheral 1, and transmits services obtained by this analysis from the communications portion (output portion) 21 to the external device.

The API (application programming interface) is an interface provided, in a case where processing is carried out by a certain control mechanism, as a method for using functions provided by other hardware or software. In the present embodiment, the API is used for example as (1) an interface for executing the aforementioned basic functions of the multifunction peripheral 1 executed by a controller 11 of the multifunction peripheral 1 from other than its own firmware, and (2) an interface for executing the aforementioned basic functions of the external device executed by a control portion of the external device from other than its own firmware. The API access the controller 11 within the firmware of the multifunction peripheral 1 or the control portion within the firmware of the external device through the platform 13 of the multifunction peripheral 1 or a communications interface of the external device to execute the aforementioned basic functions of the multifunction peripheral 1 or the external device. However, applications of the API in the present embodiment are not limited to these examples.

The operation portion 27 is constituted by a mouse pointer or a keyboard and the like, and receives various instructions from the operator through operations of the operator. That is, in the present embodiment, the operator can generate display screens to be displayed on the display portion 50 of the multifunction peripheral 1 from either the PC 31 or the server computer SV2 by operating the operation portion 313 of the PC 31 or the operation portion 27 of the server computer SV2.

The display portion 28 is constituted by an LCD (liquid crystal display) or the like and displays various images in accordance with display control by the control unit 200.

As described above, in the present embodiment, the server computer SV2 indicates a system that carries out server management type processing of managing the aforementioned screen data so that processes up to screen data generation are carried out by the screen data generation portion 3104 in the PC 31, then the generated screen data is transmitted to the server computer SV2 through the communications portion 311, and the storage portion 22 of the server computer SV2 stores this generated screen data, then, in accordance with a screen data output instruction from the multifunction peripheral 1, the business logic 24 and the script interpreter 23 read out from the storage portion 22 the screen data indicated by this output instruction, and furthermore, jobs and services associated with the display object parts indicated by the parts specification instruction from the multifunction peripheral 1 are transmitted from the communications portion 21 to the multifunction peripheral 1 or the external device. In this case, the server computer SV2 is one example of an information processing device within the scope of the claims.

On the other hand, the multifunction peripheral 1 is provided with the controller 11, a storage portion 12, the platform 13, an intermediary application 14, the web browser 16, and the display portion 50.

The controller 11 administers the overall operational control of the multifunction peripheral 1. The controller 11 is provided as firmware and executes basic functions of the multifunction peripheral 1 such as transmission of scan data, printing, data access, system settings, network communications, job control, and data registration.

The platform 13 is a foundation for the API (application programming interface) and the like to operate. The platform 13 is also responsible for relays between the controller 11 and the API.

Further still, the platform 13 obtains from the server computer SV2 via the LAN or the like display data of screen data that is for display objects of the display portion 50 (data after HTML conversion processing by the script interpreter 23) and various instructions.

It should be noted for example that at time when a display screen (for example, an application selection screen 51 of FIG. 3) or the like is displayed on the display portion 50, the controller 11 carries out an inquiry to the extended application 20 of the server computer SV2 via the platform 13 when there is a pressing operation of a scan button 511 (one example of a display object part) by the operator using the touch panel function or the like. That is, the controller 11 sends to the extended application 20 of the server computer SV2 a parts specification instruction indicating that the scan button 511 has been specified by the operator via the platform 13, and the business logic 24 of the extended application 20 analyzes the job or service that is set for the display object part (the scan button 511) indicating that parts specification instruction.

Figure 4:
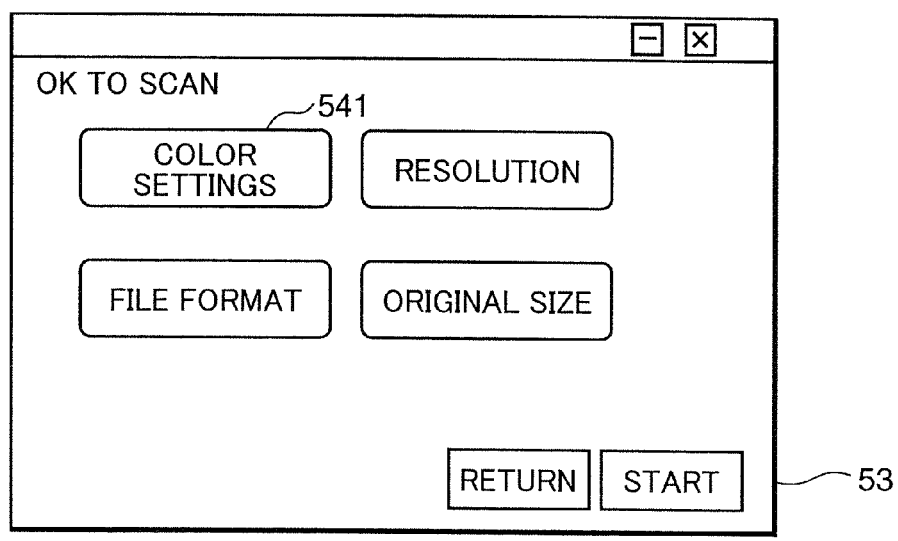
FIG. 4 is a diagram showing an example of a scan setting screen.

It should be noted that in a case where the display object part indicating the parts specification instruction is the scan button 511 as in this example and the job or service analyzed in the business logic 24 of the extended application 20 is a job meaning "transition to display screen of the display portion 50 of the multifunction peripheral 1," in order to enable a display screen transition to a scan setting screen 53 shown in FIG. 4 for example, the script interpreter 23 of the extended application 20 commences analysis of the screen data, which is constituted by a script file stored in the storage portion 22 and data conversion to HTML format. The business logic 24 generates a control command (API) for executing the display screen transition, which is the analyzed job, on the multifunction peripheral 1.

The storage portion 12 is constituted by an HDD or the like, and stores an operational control program to cause operation as the controller 11 and a program of the web browser 16 and the like. The CPU, which is the central control portion of the multifunction peripheral 1, functions as the controller 11 and the web browser 16 and the like by operating in accordance with the programs stored in the storage portion 12.

The intermediary application 14 carries out an intermediary process to enable the display data, which was received by the platform 13 from the server computer SV2 and has undergone HTML conversion processing, to be processed by the web browser 16.

The web browser 16 displays on the display portion 50 the display data that has undergone HTML conversion processing, which is obtained from the script interpreter 23 and the business logic 24. In the present embodiment, the web browser 16 is an interface that displays display screens on the display portion 50 conforming to screen components indicated by a file that has undergone HTML conversion processing, which is converted by the extended application 20, and receives instruction input operations from the operator during display of this display screen via the touch panel function of the display portion 50.

The display portion 50 is constituted by an LCD (liquid crystal display) or the like and displays various images in accordance with display control by the controller 11.

Figure 5:
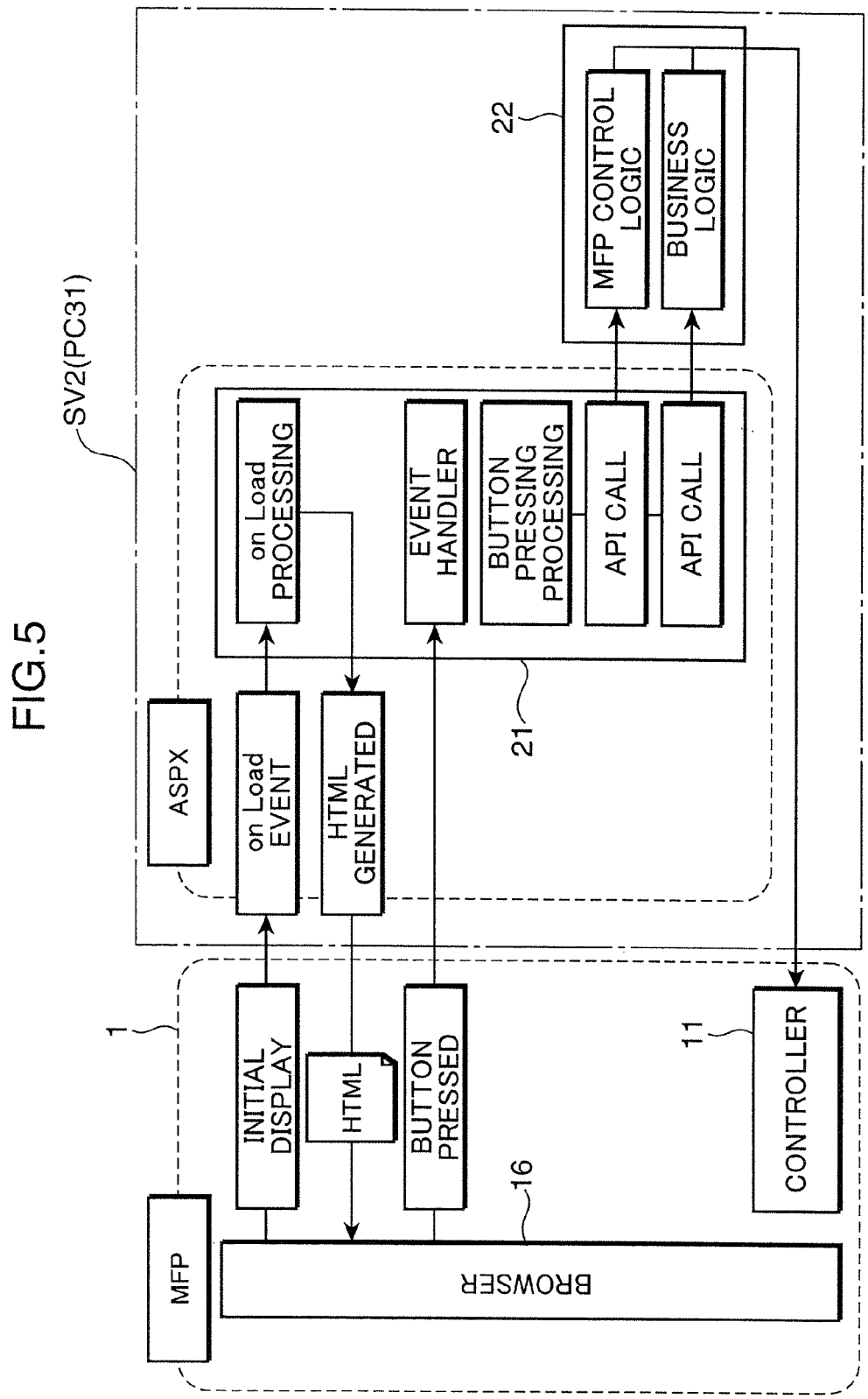
FIG. 5 is a schematic diagram showing screen display processing and operational control in the operational control system.

Further description is given regarding screen display processing and operational control in the operational control system 10. FIG. 5 is a schematic diagram showing screen display processing and operational control in the operational control system 10. Here, description is given using an example of the aforementioned server management type processing in which screen data generated by the PC 31 is stored in the storage portion 22 of the server computer SV2, and operational control of the multifunction peripheral 1 is carried out between the multifunction peripheral 1 and the server computer SV2 based on a pressing operation by the operator of display object parts in the display screens displayed on the display portion 50 of the multifunction peripheral 1.

When the power is turned on at the multifunction peripheral 1, the web browser 16 displays a predetermined initial display screen on the display portion 50.

When the multifunction peripheral 1 requires screen data to display a display screen on the display portion 50 such as when switching the display screens, the platform 13 transmits to the server computer SV2 an output instruction of screen data to display a display screen on its display portion 50 under the control of the web browser 16 and the controller 11.

The business logic 24 (analysis portion) of the server computer SV2 receives the output instruction from the multifunction peripheral 1 as an on load event. The business logic 24 carries out on load processing based on this on load event. That is, the business logic 24 reads out from the storage portion 22 via the script interpreter 23 the screen data of the display screen indicated by the output instruction, and this is transmitted from the communications portion 21 to the platform 13 of the multifunction peripheral 1 after the screen data is converted to HTML format by the script interpreter 23.

In the multifunction peripheral 1, the HTML format screen data is received by the platform 13, and the received screen data is display by the web browser 16 on the display portion 50.

Here, when any of the display buttons (the display object parts functions as the display buttons) are pressed on the display screen by an operation of the operator using the touch panel function during display of the display screen by the web browser 16, the parts specification instruction indicated by the display object part that has been pressed is received by the web browser 16, and this parts specification instruction is sent from the web browser 16 via the platform 13 and the communications portion 21 and the like to the business logic 24 of the extended application 20 of the server computer SV2.

In relation to the display object part indicated by the parts specification instruction, the business logic 24 analyzes the job or service or both (hereinafter simply referred to as "job or the like") associated with that display object part based on the screen data stored in the storage portion 22.

When the business logic 24 analyzes that the job or the like associated with the display object part indicated by the parts selection instruction is a job of the multifunction peripheral 1, the business logic 24 calls (an API call) from a control logic of the multifunction peripheral (constituted by a control logic group for performing operational control of the various operational mechanisms of the multifunction peripheral 1) indicated by middleware stored in the storage portion 22 an API corresponding to the job or the like for executing the analyzed job on the multifunction peripheral 1, and executes the API on the multifunction peripheral 1 via the communications portion 21. Here, in a case where the analyzed job is an operation of the operational mechanisms of the multifunction peripheral 1 but is an operation that is newly generated and set by the operator, the business logic 24 calls an API corresponding to that job based on the business logic (constituted by a control logic group of jobs newly generated and set by the operator) indicated by the middleware that is stored in the storage portion 22, and executes the API on the multifunction peripheral 1 via the communications portion 21.

It should be noted that in a case where the analyzed job or the like is a service using the external device other than the multifunction peripheral 1, the business logic 24 calls an API corresponding to that service based on the business logic (constituted by a control logic group of predetermined services of the external devices) indicated by the middleware that is stored in the storage portion 22, and executes the API on the relevant external device via the communications portion 21.

In the multifunction peripheral 1, the API accesses to the controller 11 in the firmware of the multifunction peripheral 1 through the platform 13, and the controller 11 executes the job corresponding to the API. Alternatively, in the interface of the external device, the API accesses to the control portion in the firmware of the external device through the interface, and the control portion executes the service corresponding to the API.

Figure 6:
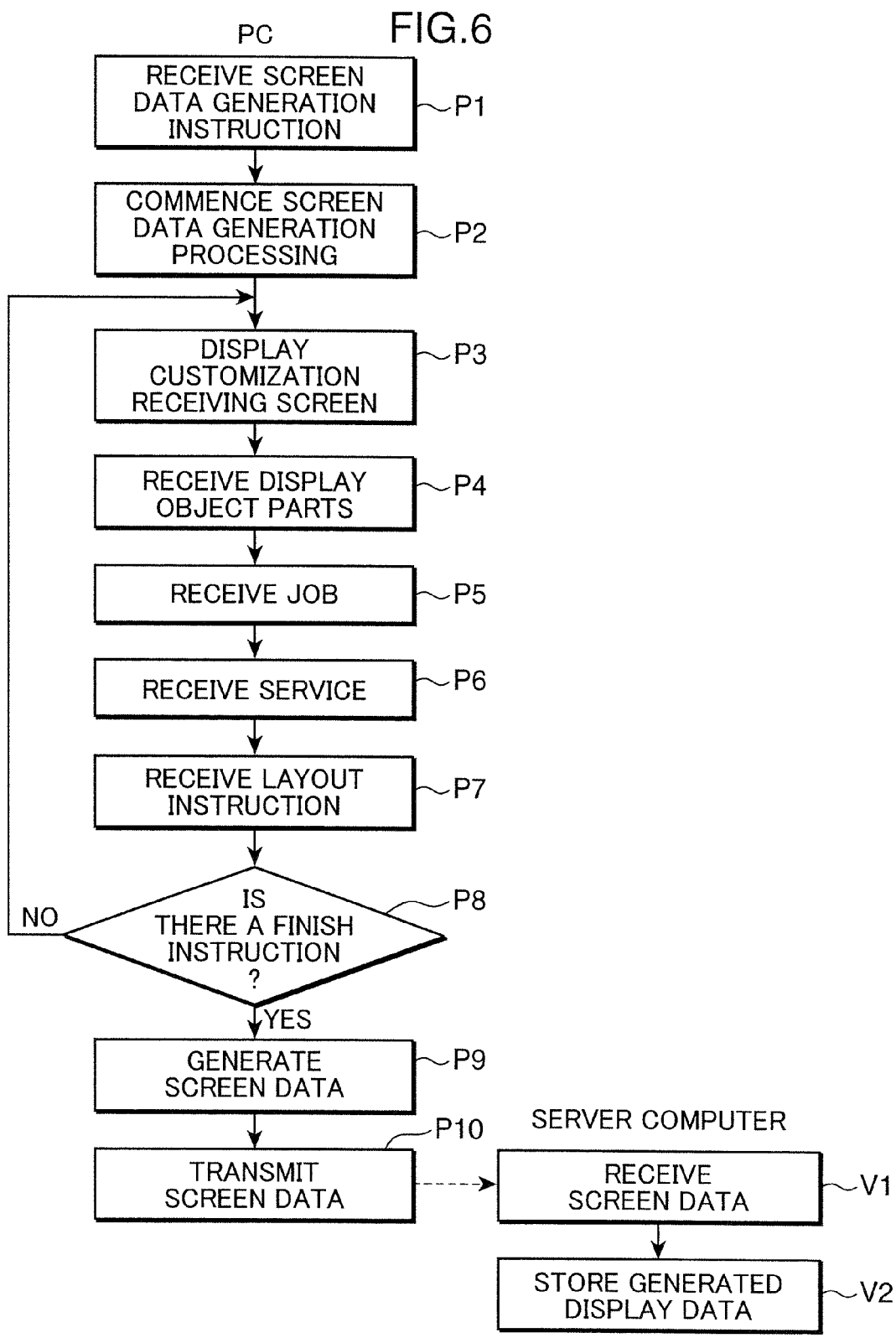
FIG. 6 is a diagram showing processing during display screen generation by the PC and the server computer of the operational control system according to the first embodiment.

FIG. 6 is a diagram showing processing during display screen generation by the PC 31 and the server computer SV2 of the operational control system 10 according to the first embodiment. For this processing also, description is given using the aforementioned server management type processing as an example.

Figure 7:
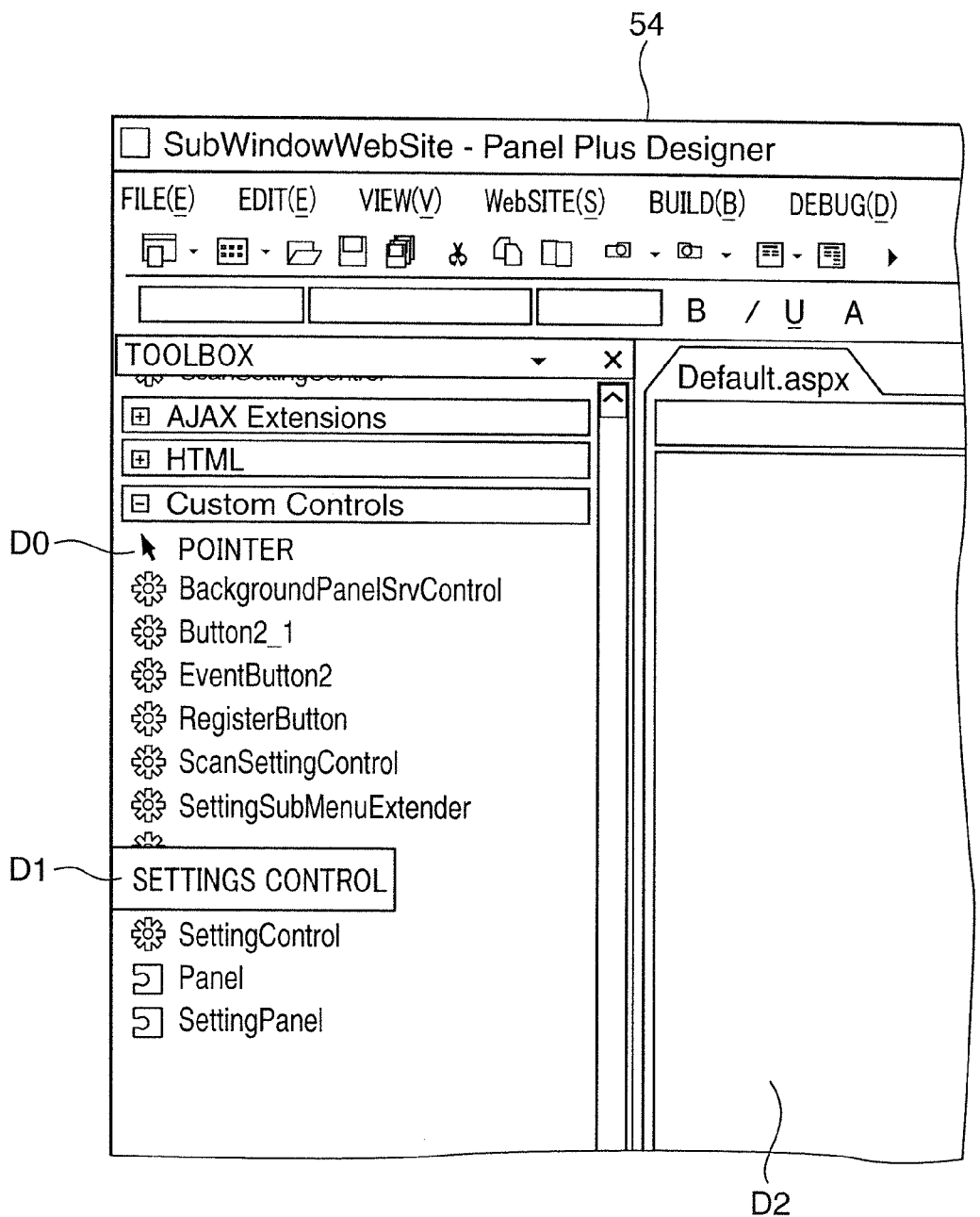
FIG. 7 is a diagram showing an example of a customization receiving screen.

The operator inputs a display screen generation instruction by operating the operation portion 313 of the PC 31 for example. When the display screen generation instruction input by the operator is received at the control portion 310 (P1), the control portion 310 commences screen data generation processing (P2) based on the display screen generation program stored in the storage portion 312. For example, the control portion 310 displays on the display portion 315 display data of a customization receiving screen 54 as shown in an example in FIG. 7 (P3). In this customization receiving screen 54, a list of multiple display object parts stored by the display screen generation program, which is stored in the storage portion 312, is displayed in a toolbox region D0.

Figure 8:
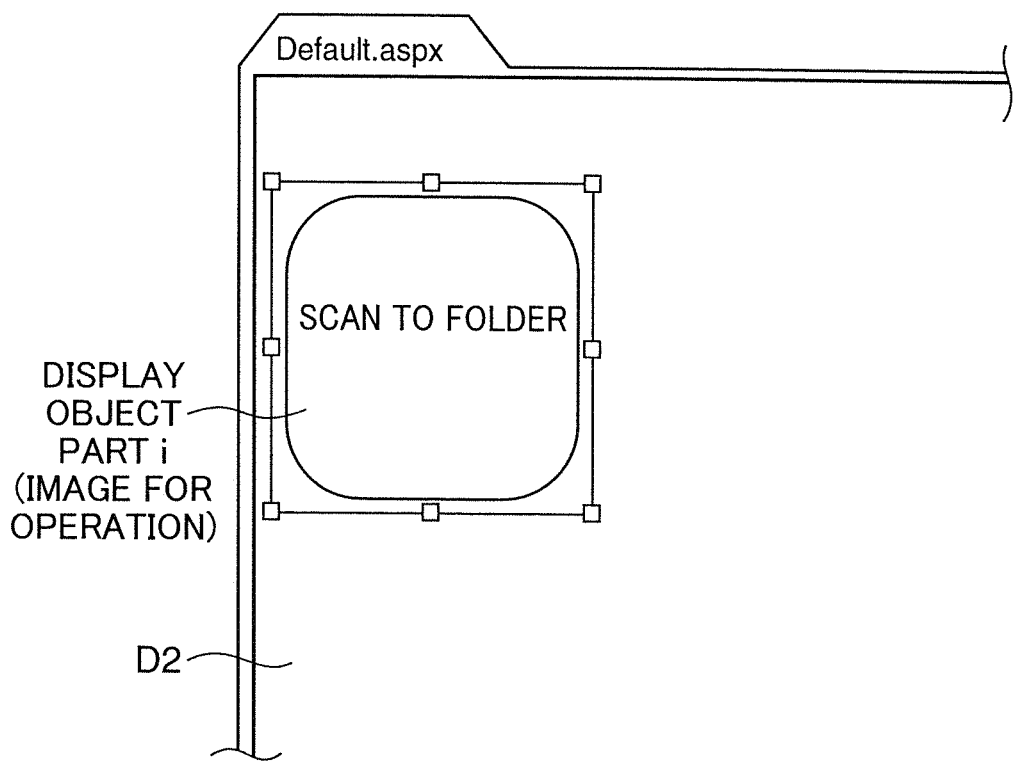
FIG. 8 is a diagram showing an example of a customization receiving screen.

For example, in accordance with an operation or the like in which a settings control display area D1 of the customization receiving screen 54 is specified by a left click by the operator at the operation portion 313, which is constituted by a mouse pointer or the like, when an instruction in which a display object part is selected indicated by an image name displayed in this display area D1 is received by the control portion 310 (P4), the control portion 310 displays a display object part i that has been specified within a display region D2, which constitutes one portion of the customization receiving screen 54 as shown in FIG. 8.

Figure 9:
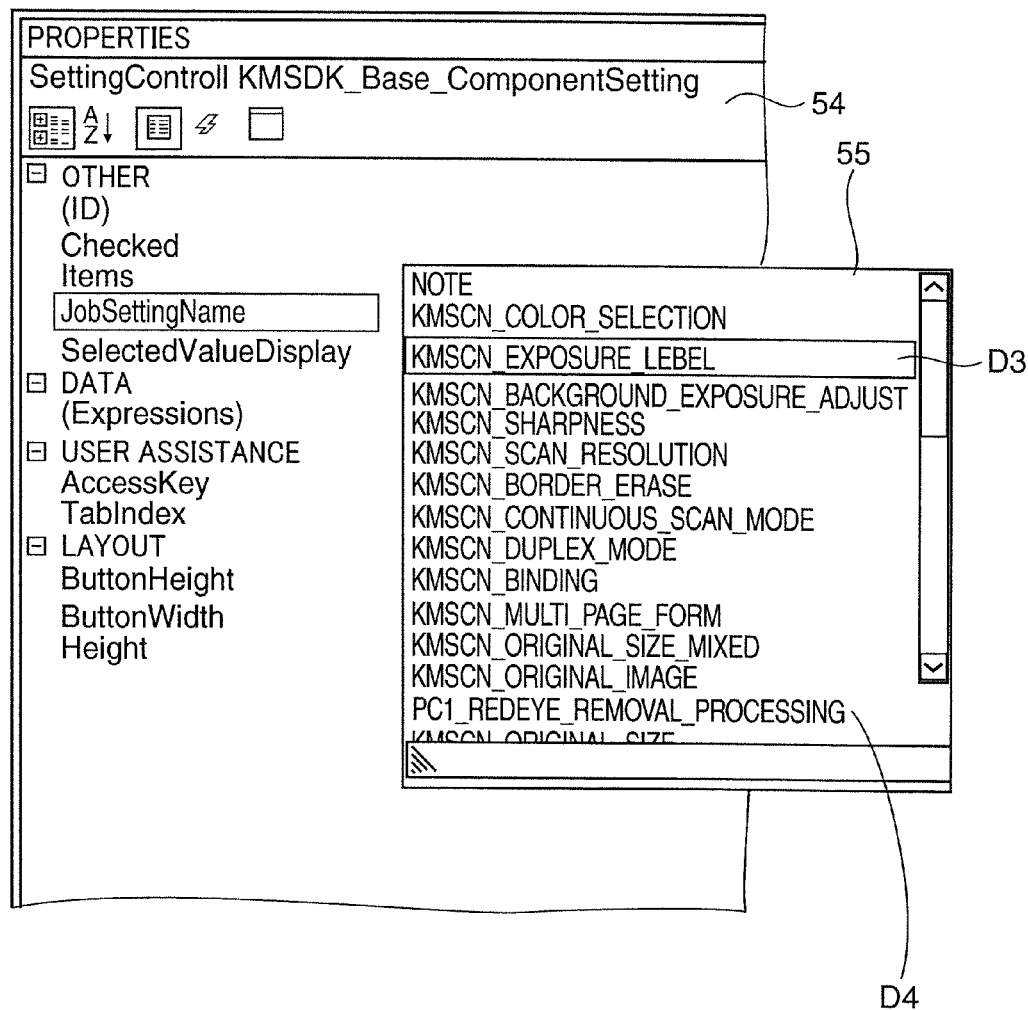
FIG. 9 is a diagram showing an example of a job and service title list screen.

Then, in accordance with an operation or the like specified by a left click by the operator at the operation portion 313, which is constituted by a mouse pointer or the like, the control portion 310 displays in the display portion 315 a job and service title list screen 55 as shown in FIG. 9 for example. For example, the control portion 310 displays the job and service title list screen 55 overlaid over the customization receiving screen 54, which is already displayed.

When a job desired by the operator is selected by specifying a display area D3 in which the desired job title is being displayed in the job and service title list screen 55 by an operation or the like of the operation portion 313 by the operator during display of the job and service title list screen 55 on the display portion 315, the selection instruction is received by the job selection instruction receiving portion 3102 (P5). At this time, the control portion 310 may display in the display region D2 the selected job title overlaid over the display object part.

Further still, for example, when a service desired by the operator is selected by further specifying a display area D4 in which the desired service title is being displayed in the job and service title list screen 55 by a right click operation or the like of the operation portion 313, which is constituted by a mouse pointer or the like, the selection instruction is received by the external service selection instruction receiving portion 3103 (P6). At this time, the control portion 310 may display in the display region D2 the selected service title overlaid over the display object part.

It should be noted in regard to the processing of the aforementioned P5 and P6 that it is possible for only one of these to be carried out selectively, or for both to be carried out.

For example, with the aforementioned series of processes, by operating the operation portion 313, the operator can associate a job such as "execute scan operation" or "send file of scanned image data to PC 31," and a service such as "carry out image processing of redeye removal processing on image data of file received from multifunction peripheral 1" with the selected display object part. For this reason, by operating the operation portion 313, the operator can simply generate screen data of display screens provided with operation buttons (display object parts) for inputting instructions by which a job by the multifunction peripheral 1 such as "execute scan operation" and "send file of scanned image data to PC 31," and a service by the external device such as "carry out image processing of redeye removal processing on image data of file received from multifunction peripheral 1" are carried out in cooperation.

Further still, when the operator moves a display object part displayed in the region D2 by a drag and drop operation of operation portion 313, which is constituted by a mouse pointer or the like, to change a display position of the display object part in the region D2, the position in the region D2 of the display object part changed by the operator is set as a layout instruction indicating the position of the display object part in the display screen, and this layout instruction is received by the layout instruction receiving portion 3105 (P7).

It should be noted in regard to the processes in the aforementioned P3 to P7 that the selection receiving processing of jobs and services is repeated (P8) for multiple display object parts until the operator using the PC 31 clicks a finish button (unshown) of the customization receiving screen 54 using the mouse or the like, thereby inputting from the operator an instruction to finish display screen generation.

When the instruction to finish display screen generation is inputted from the operator and received by the control portion 310 (yes at P8), the selected jobs and services are associated with each of the display object parts respectively in accordance with the display object parts for which a job or service selection has been received at that time point and the layout instructions for the display object parts, and screen data is generated by the screen data generation portion 3104 (P9).

After screen data generation by the screen data generation portion 3104, the screen data generation portion 3104 transmits the generated screen data to the server computer SV2 using the communications portion 311 (P10).

In the server computer SV2, when the generated screen data is received by the communications portion 21 (V1), the screen data is stored in the storage portion 22 by the control unit 200 (V2).

Furthermore, in a case where all of the processes from generation of screen data to storage of screen data is carried out by the server computer SV2, the processes of the aforementioned P1 to P9 are carried out by the server computer SV2, and the generated screen data is stored in the storage portion 22.

Figure 10:
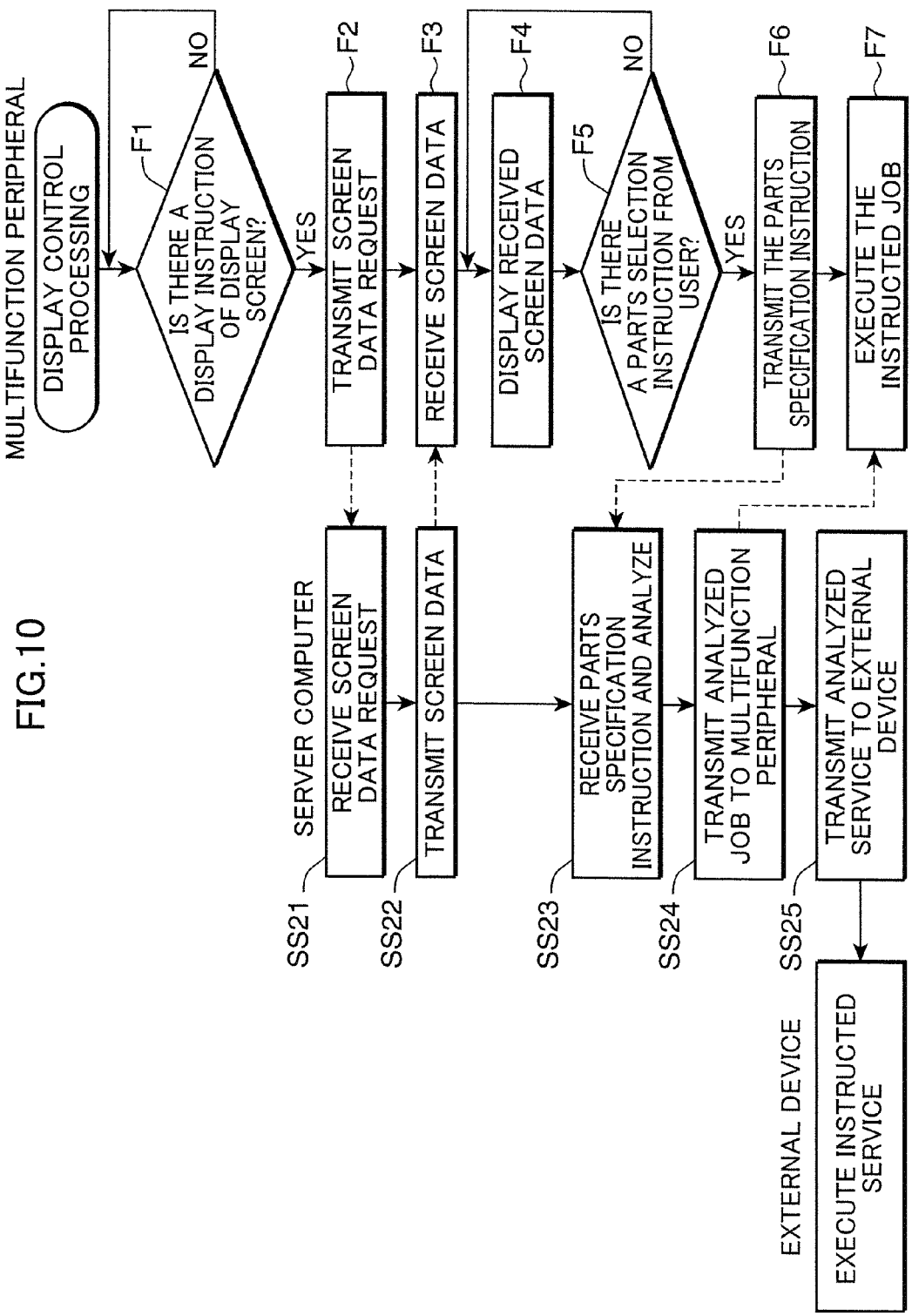
FIG. 10 is a flowchart showing display processing of display screens on the display portion of the multifunction peripheral using the generated screen data and operational execution control of the multifunction peripheral based on an instruction to execute operation from the operator with the operational control system according to the first embodiment.

Next, description is given regarding display processing of display screens on the display portion 50 of the multifunction peripheral 1 using the generated screen data and operational execution control of the multifunction peripheral 1 based on an instruction to execute operation from the operator with the operational control system 10. FIG. 10 is a flowchart showing display processing of display screens on the display portion 50 of the multifunction peripheral 1 using the generated screen data and operational execution control of the multifunction peripheral 1 based on an instruction to execute operation from the operator with the operational control system 10 according to the first embodiment. It should be noted that here also, description is given using server management type processing as an example.

It should be noted that, in a case where the server computer SV2 is connected to multiple multifunction peripherals 1, by carrying out the processing indicated below with any of the connected multifunction peripherals 1, it is possible to display the display screens on the display portion 50 of each of the multifunction peripherals 1 to carry out operational execution control of the multifunction peripherals 1.

In the multifunction peripheral 1, when a necessity arises to display a display screen on the display portion 50 (yes at F1) based on an instruction or the like according to an operation of an unshown operational portion by the operator, the controller 11 transmits an output instruction to the server computer SV2 via the platform 13 to an effect of requesting transmission of screen data of the display screen corresponding to that operation (F2).

In the server computer SV2, when the communications portion 21 receives the output instruction (SS21), the script interpreter 23 reads out (SS22) from the storage portion 22 the screen data (script file) indicating the output instruction, then analyzes the screen data that has been read out, and carries out HTML conversion processing for displaying the display screen on the display portion 50.

That is, the script interpreter 23 carries out data conversion processing of converting to a data format (HTML format in the present embodiment) that can be displayed on the display portion 50 by the web browser 16 of the multifunction peripheral 1, and carries out a process of constructing a display screen indicated by the script file by assigning character strings to screens and buttons using screen templates, button templates, and character string data, which are structural elements of the display screens, as display object parts in response to the number and placement of keys to be displayed within the screen indicated by the script files.

Following this, the business logic 24 transmits the data that has undergone the HTML processing obtained from the script interpreter 23 to the platform 13 of the multifunction peripheral 1 from the communications portion 21 as display data that is displayable on the display portion 50 (SS22).

When the platform 13 of the multifunction peripheral 1 receives (F3) the screen data of HTML format data from the server computer SV2, the web browser 16 displays this screen data on the display portion 50 (F4).

When any of the display buttons (display object parts) displayed on the display portion 50 is pressed (yes at F5) by an operation or the like of the operator using the touch panel function during display of the display screen by the web browser 16, the parts specification instruction indicated by the pressed display button (display object part) is sent from the web browser 16 via the platform 13 to the server computer SV2 (F6).

Here, in a case where parts specification instructions have been set by the operator in regard to both a display button (display object part) associated with a job executable by the multifunction peripheral 1, and a display button (display object part) associated with a service executable by an external device other than the multifunction peripheral 1, which is set separately to this, the web browser 16 receives the parts specification instructions in regard to these display buttons (display object parts) respectively. In this case, at F6, the parts specification instructions indicated by the display buttons (display object parts) that have been pressed respectively are sent from the web browser 16 to the server computer SV2 via the platform 13.

When the parts specification instructions are received by the communications portion 21 in the server computer SV2, the business logic 24 analyzes (SS23) the jobs and services associated with the display buttons (display object parts) indicated by the parts specification instructions based on information (data stored in the storage portion 22 (screen data of display screens including the display object parts indicated by the parts specification instructions)), which has been transferred from the script interpreter 23.

Here, in a case where the communications portion 21 of the server computer SV2 has received multiple parts specification instructions, the business logic 24 performs analysis on the jobs and services associated with the display object parts indicated by the multiple parts specification instructions for each of the display object parts respectively.

Figure 3:
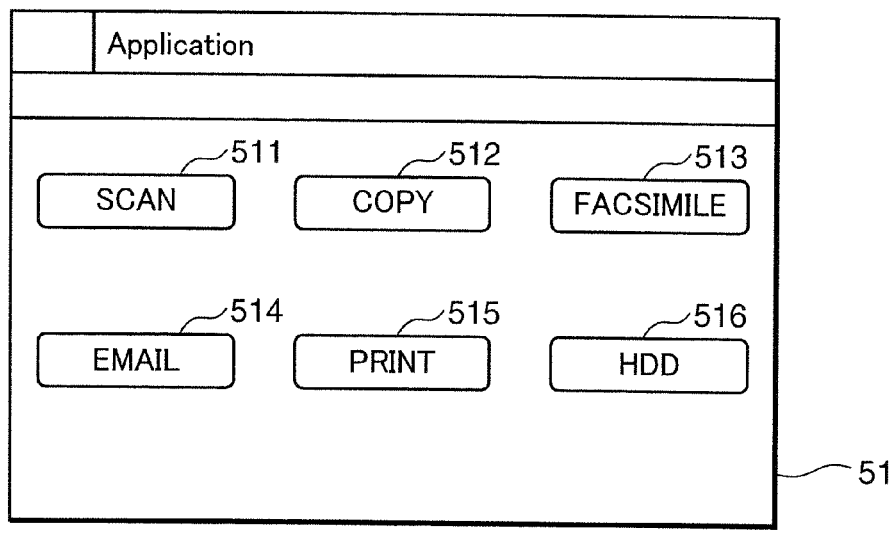
FIG. 3 is a diagram showing an example of an application selection screen.

For example, in the application selection screen 51 shown in FIG. 3, when the scan button 511 is pressed by the operator among the four operation buttons 511, 512, 513, and 514 as display object parts, and the pressing of this operation button is received by the web browser 16, the parts selection instruction indicating the operation button (display object part) that has been pressed is sent to the server computer SV2.

In this case, based on the screen data stored in the storage portion 22, the business logic 24 of the server computer SV2 analyzes that the job corresponding to the scan button 511 as the display object part indicating the parts selection instruction is a job of "execute scan operation" and "send file of scanned image data to PC 31" for example.

Alternatively, in a case where the scan setting screen 53 of FIG. 4 is being displayed on the display portion 50, when the color setting button 541 is pressed by the operator, and the pressing of this operation button is received by the web browser 16, the parts specification instruction indicating the operation button (display object part) that has been pressed is sent to the server computer SV2. In the server computer SV2, based on the screen data stored in the storage portion 22 via the script interpreter 23, the business logic 24 analyzes that the operation corresponding to the color setting button 541 as the display object part indicated by the parts specification instruction is an operation for displaying on the display portion 50 a display screen having an operation button for setting which color mode to carry out printing for example.

Following this, in order to execute the analyzed job, the business logic 24 calls the API corresponding to that job and executes the API on the multifunction peripheral 1 via the communications portion 21 (SS24). However, in a case where analysis of the jobs and services associated with the multiple display object parts is carried out at SS23 and the multiple jobs have been analyzed, each API corresponding to these multiple jobs are called, and each of the APIs is executed on the multifunction peripheral 1 respectively via the communications portion 21. It should be noted that the processing of SS24 is not carried out in a case where jobs for the multifunction peripheral 1 have not been analyzed at SS23.

Figure 11:
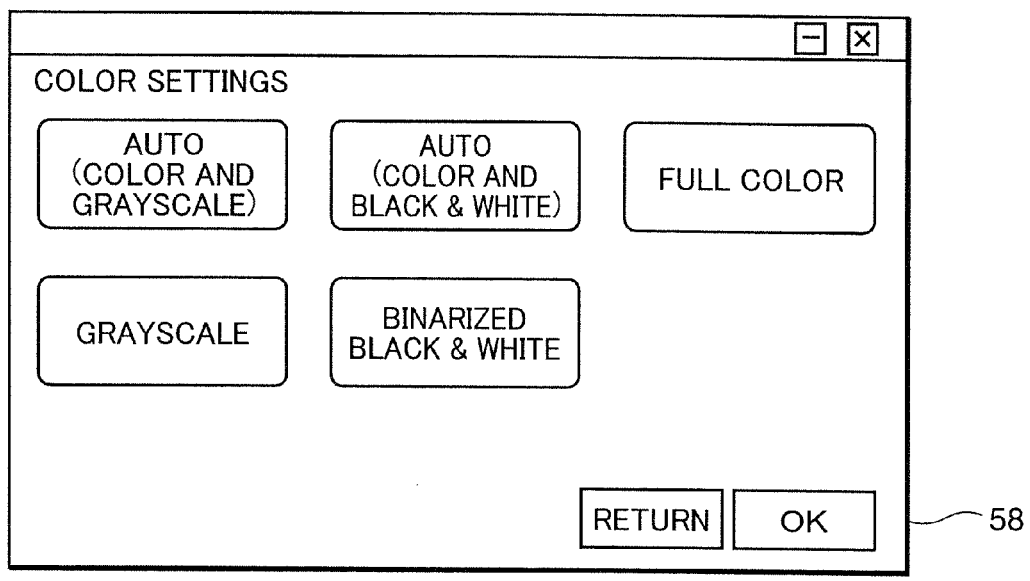
FIG. 11 is a diagram showing an example of a display screen.

In the multifunction peripheral 1, the API accesses to the controller 11 in the firmware of the multifunction peripheral 1 through the platform 13, and the controller 11 executes the job corresponding to the API (F7). For example, in a case of the example described using FIG. 3, the controller 11 executes the "execute scan operation" and "send file of scanned image data to PC 31." For example, in the case of the example described using FIG. 4, the controller 11 and the web browser 16 execute the "operation for displaying on the display portion 50 a display screen having an operation button for setting which color mode to carry out printing," and for example a display screen 58 provided with operation buttons (display object parts) for setting the color settings in detail is displayed on the display portion 50 by the controller 11 and the web browser 16, as shown in FIG. 11 based on the APIs and screen data sent from the server computer SV2.

Further still, in order to execute the service that has been analyzed at SS23, the business logic 24 calls the API corresponding to that service, and the API is executed via the communications portion 21 on the external device that is set as the service execution target whose API was analyzed at SS23 (SS25). At the external device, the API accesses to the control portion in the firmware of the external device through the interface, and the control portion executes the service corresponding to the API.

For example, in a case where the analyzed service is "image processing of redeye removal processing for image data of the file received from the multifunction peripheral 1," the business logic 24 calls an API of redeye removal processing or the like as a control command for executing the redeye removal processing or the like on the external device. In a case where the API has been executed as the control command for the external device to execute redeye removal processing, the control portion of the external device executes "image processing of redeye removal processing for image data of the file received from the multifunction peripheral 1" in accordance with the API.

However, in a case where analysis of the jobs and services associated with the multiple display object parts is carried out at SS23 and the multiple services have been analyzed, each API corresponding to these multiple services is called, and each of the APIs is executed on the external device that is set as the service execution target respectively via the communications portion 21. It should be noted that the processing of SS25 is not carried out in a case where services for the external devices have not been analyzed at SS23.

Figure 12:
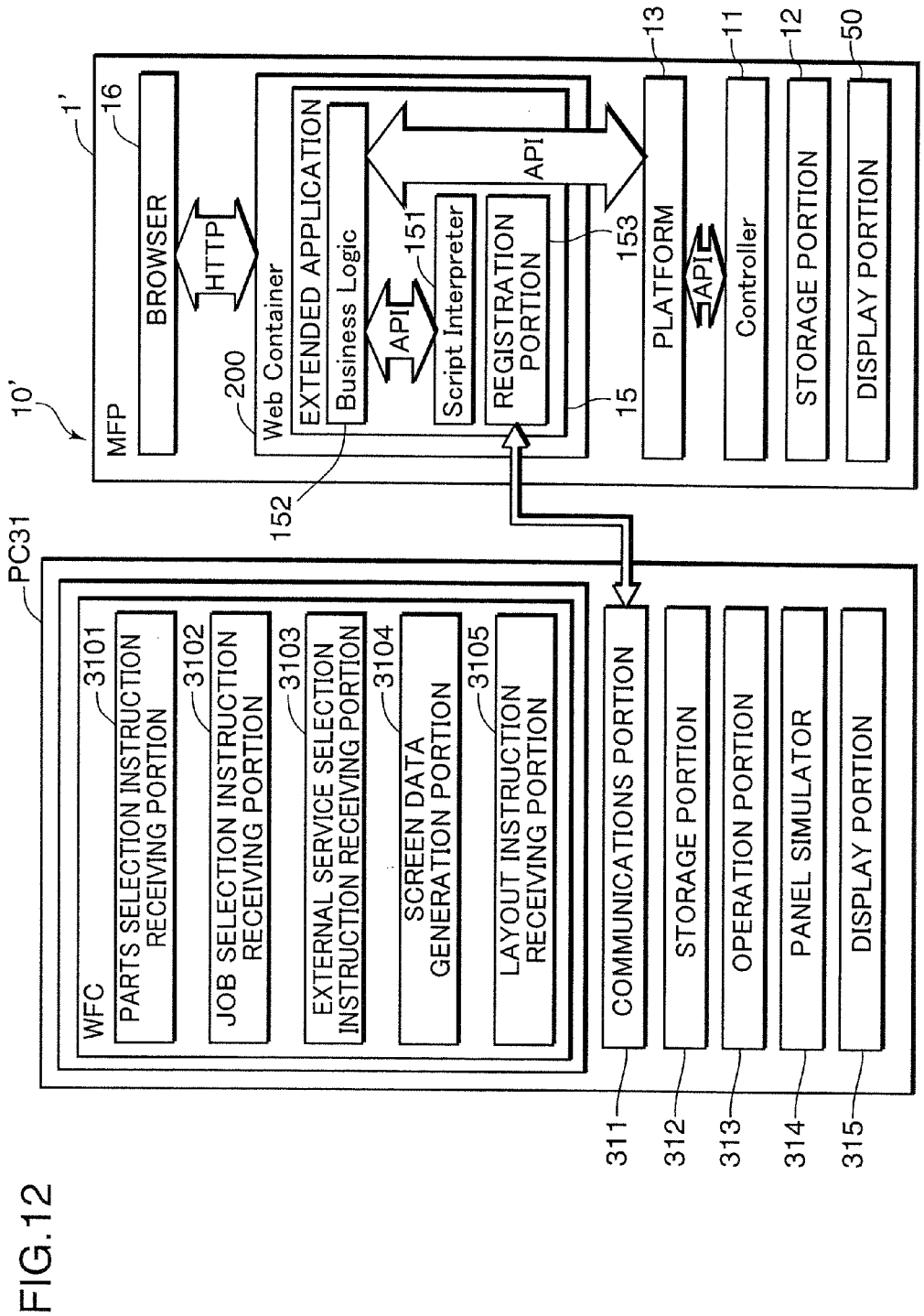
FIG. 12 is a diagram showing a second embodiment of an operational control system according to one embodiment of the present invention.

Next, description is given of a second embodiment of an operational control system and image forming apparatus according to one embodiment of the present invention. FIG. 12 is a diagram showing the second embodiment of an operational control system according to one embodiment of the present invention. It should be noted that description is omitted for configurations that are the same in the first embodiment. For example, in the second embodiment, the PC 31 has the same configuration and same handling as in the first embodiment.

An operational control system 10' according to the second embodiment is provided with a PC 31 and a multifunction peripheral 1'. In the operational control system 10', the multifunction peripheral 1' stores the screen data that has been generated at the PC 31 and transmitted from the PC 31 in a registration portion 153, which is described later, and when a display object part is specified by an operation based on the display screen by the operator during display of the display screen on the display portion 50, the multifunction peripheral 1' analyzes and executes the operation associated with the display object part that has been selected by the operator.

In a case of the second embodiment, processes up to screen data generation processing by the screen data generation portion are carried out in the PC 31, and the multifunction peripheral 1' obtains from the PC 31 the screen data that has been generated via the communications portion 21. However, in the multifunction peripheral 1', the registration portion 153 obtains the screen data from the PC 31. The obtaining of the screen data from the PC 31 is not limited to network communications such as the LAN or the like, and the multifunction peripheral 1' can obtain this from the PC 31 by email, or the multifunction peripheral 1' can obtain the screen data and store it in the storage portion 12 by an operator reading the screen data stored on a USB memory or the like by the PC 31 at an unshown memory interface provided in the multifunction peripheral 1'.

The multifunction peripheral 1' has a controller (control portion) 11, a storage portion 12, a platform 13, an extended application 15 provided in a control unit (web container) 200, and a web browser (a display control portion and parts specification instruction receiving portion) 16.

The extended application 15 of the multifunction peripheral 1' is constituted chiefly by a script interpreter 151, a business logic 152, and the registration portion 153.

The registration portion 153 registers as display data of the display portion 50 the screen data of the script file that has been sent from the communications portion 311 of the PC 31 (or read out from the external memory), and stores this in the storage portion 12.

It should be noted that the registration portion 153 and the storage portion 12 function as a display data obtaining portion.

The script interpreter (analysis portion) 151 analyzes the content that is read in of the file of the script file, which is the display screen data registered in the storage portion 12 by the registration portion 153. The script interpreter 151 carries out HTML conversion processing for displaying the display screens on the display portion 50, and an expansion process to the business logic 152 for executing actions associated with the display object parts of operation buttons and the like placed within the display screen. The script interpreter 151 transfers the data, on which the conversion process to HTML format was carried out for display, to the business logic 152 via an API.

The business logic 152 transmits the display data that has undergone HTML conversion processing received from the script interpreter 151 to the web browser 16. Furthermore, the business logic 152 controls the actions of the multifunction peripheral 1' and the external devices (operations of the multifunction peripheral 1' and the external devices) based on information (information indicating the jobs of the multifunction peripheral 1' and services of the external devices associated with the display object parts) obtained from the aforementioned script interpreter 151.

That is, in a same manner as the business logic 24 of the server computer SV2 in the first embodiment, when a display object part such as an operation button or the like displayed on the display screen, which is displayed on the display portion 50 by the web browser 16 of the multifunction peripheral 1', is specified, the business logic 152 obtains from the web browser 16 the parts specification instruction of which display object part has been specified, and analyzes the jobs and services that are set in the display object part indicated by the parts specification instruction based on information (information obtained by analysis of the script files by the script interpreter 151 (information indicating jobs of the multifunction peripheral 1' and services of the external devices associated with the display object parts)), which has been transferred from the script interpreter 151, and calls the API corresponding to the analyzed job or service in order to execute the analyzed job or service. Analyzed jobs are transferred from the business logic 152 to the controller 11. Analyzed services are sent from the business logic 152 to the platform 13, and transmitted from the platform 13 to the external device.

The storage portion 12 stores the aforementioned screen data (functioning also as an operational control program), an operational control program to cause operation as the controller 11, programs of the extended application 15, and programs of the web browser 16 and the like. The CPU, which is the central control portion of the multifunction peripheral 1', functions as the controller 11, the extended application 15, and the web browser 16 and the like by operating in accordance with the programs stored in the storage portion 12.

Figure 13:
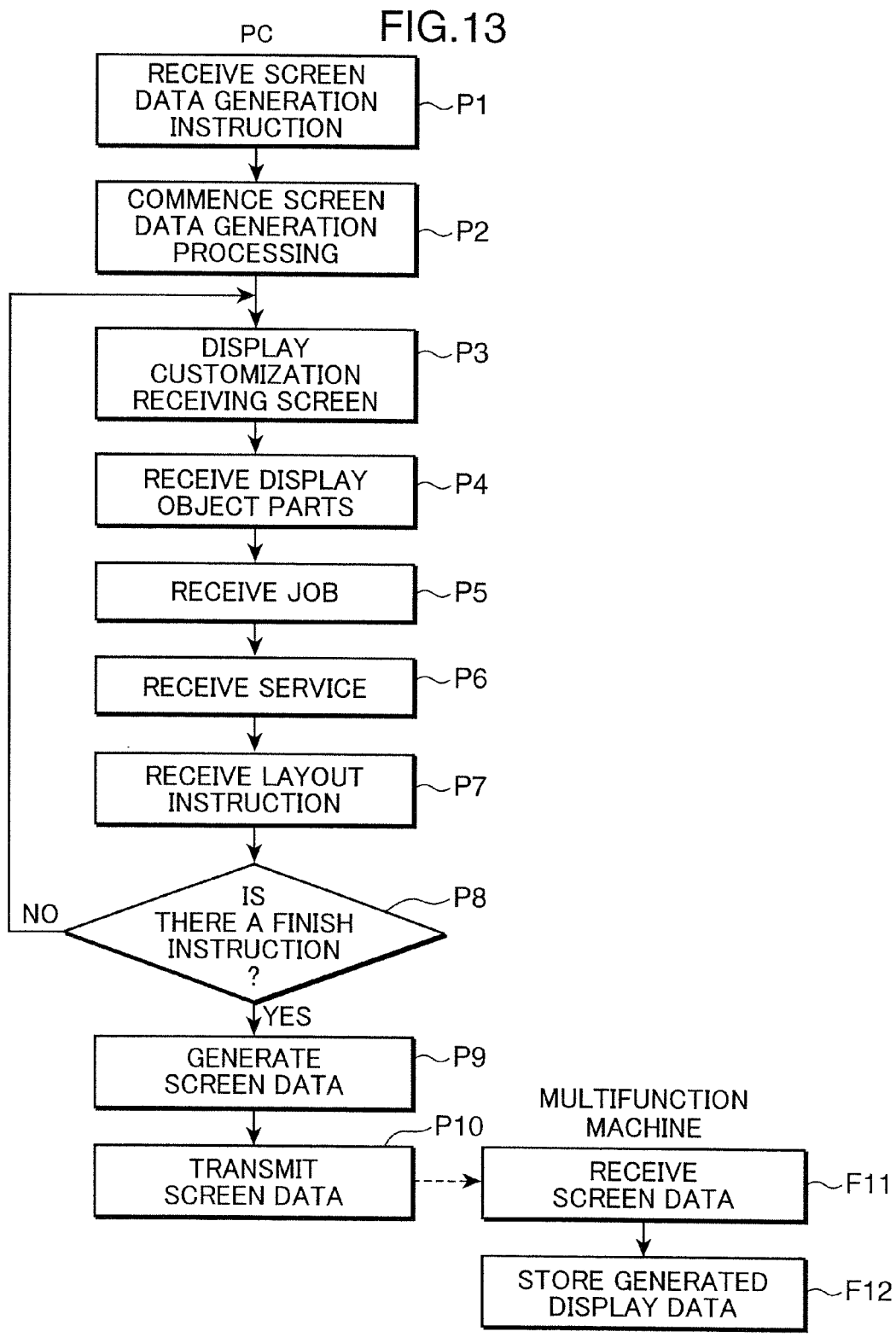
FIG. 13 is a diagram showing processing during display screen generation by the PC and the server computer in the operational control system according to a second embodiment.

FIG. 13 is a diagram showing processing during display screen generation by the PC 31 and the multifunction peripheral 1' in the operational control system 10' according to the second embodiment. It should be noted that description is omitted for processes that are the same processes described with FIG. 6.

In a same manner as the processes of P1 to P9 in FIG. 6, after screen data has been generated by the screen data generation portion 3104, the screen data generation portion 3104 transmits the generated screen data to multifunction peripheral 1' using the communications portion 311 (screen data output portion) (P11).

In the multifunction peripheral 1', when the generated screen data is received by the registration portion 153 (F11), the registration portion 153 registers the display screen data, which is constituted by a script file, as display data of the display portion 50, and stores this in the storage portion 12 (F12).

Figure 14:
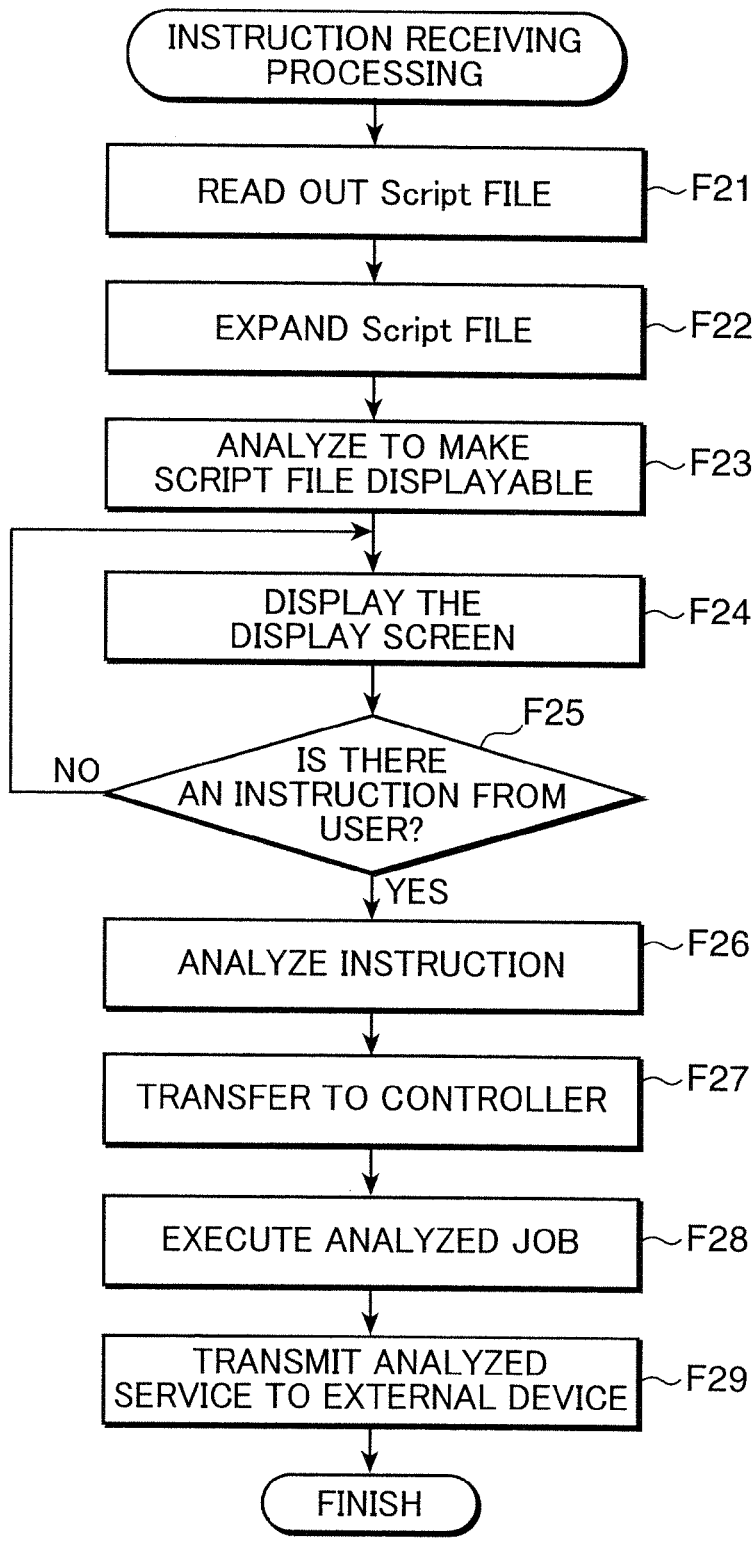
FIG. 14 is a flowchart showing display processing by the display portion of display screens generated by the PC in the multifunction peripheral and reception processing of an instruction to execute operation from the operator in the operational control system according to the second embodiment.

Next, description is given of display processing by the display portion 50 of display screens generated by the PC 31 and reception processing of an instruction to execute operation from the operator at the multifunction peripheral 1' in the operational control system 10' according to the second embodiment. FIG. 14 is a flowchart showing display processing by the display portion 50 of display screens generated by the PC 31 and reception processing of an instruction to execute operation from the operator at the multifunction peripheral 1' in the operational control system 10' according to the second embodiment.

As described earlier, display data (script files) received from the PC 31 are stored in the storage portion 12.

Here, when a necessity arises to display a display screen on the display portion 50 due to an operation or the like at the operation portion of the multifunction peripheral 1' by the operator, the script interpreter 151 reads out the screen data (script files), which were received from the PC 31 by the platform 13 of the multifunction peripheral 1', from the storage portion 12 (F21).

The script interpreter 151 analyzes the screen data that has been read out, then carries out HTML conversion processing for displaying the display screens on the display portion 50, and an expansion process to the business logic 152 for executing the jobs and services associated with the display object parts placed within the display screens (F22).

Following this, the business logic 152 analyzes the data that has undergone the HTML processing obtained from the script interpreter 151 so that it can be displayed on the display portion 50, and transfers this to the web browser 16 (F23). The web browser 16 displays the received screen data on the display portion 50 (F24).

When any of the display buttons (display object parts) displayed on the display portion 50 is pressed (yes at F25) by an operation or the like of the operator using the touch panel function during display of the display screen by the web browser 16, the parts specification instruction indicated by the pressed display button (display object part) is sent from the web browser 16 to the business logic 152 of the extended application 15.

Here, in a case where parts specification instructions have been set by the operator in regard to both a display button (display object part) associated with a job executable by the multifunction peripheral 1', and a display button (display object part) associated with a service executable by an external device other than the multifunction peripheral 1', which is set separately to this, the web browser 16 receives the parts specification instructions in regard to these display buttons (display object parts) respectively. In this case, the web browser 16 sends the parts specification instructions indicating the display buttons (display object parts) that have been pressed to the business logic 152 of the extended application 15.

When the parts specification instructions are received, the business logic 152 analyzes (F26) the jobs or services associated with the display buttons (display object parts) indicated by the parts specification instructions based on information (data stored in the storage portion 12 (screen data of display screens including the display object parts indicated by the parts specification instructions)), which has been transferred from the script interpreter 151.

Following this, in order to execute the analyzed job, the business logic 152 calls the API corresponding to that job and transfers that API to the controller 11 (F27). However, in a case where analysis of the jobs and services associated with the multiple display object parts is carried out at F26 and the multiple jobs have been analyzed, each API corresponding to these multiple jobs is called, and each of the APIs is transferred to the controller 11. However, the processing of F27 is not carried out in a case where jobs to by executed by the multifunction peripheral 1' have not been analyzed at F26.

The controller 11 executes the instructed job (F28) in accordance with the received API.

Further still, in order to execute the service that has been analyzed at F26, the business logic 152 calls the API corresponding to that service, and sends the API from the platform 13 to the external device that is set as the service execution target analyzed at F26 (F29). At the external device, the API accesses to the control portion in the firmware of the external device through the interface, and the control portion executes the operation corresponding to the API. That is, the business logic 152 and the platform 13 constitute one example of an output portion. However, in a case where analysis of the jobs and services associated with the multiple display object parts is carried out at F26 and the multiple services have been analyzed, each API corresponding to these multiple services is called, and each of the APIs is executed on the external device that is set as the service execution target analyzed at F26.

However, the processing of F29 is not carried out in a case where services for the external devices have not been analyzed at F26.

Figure 15:
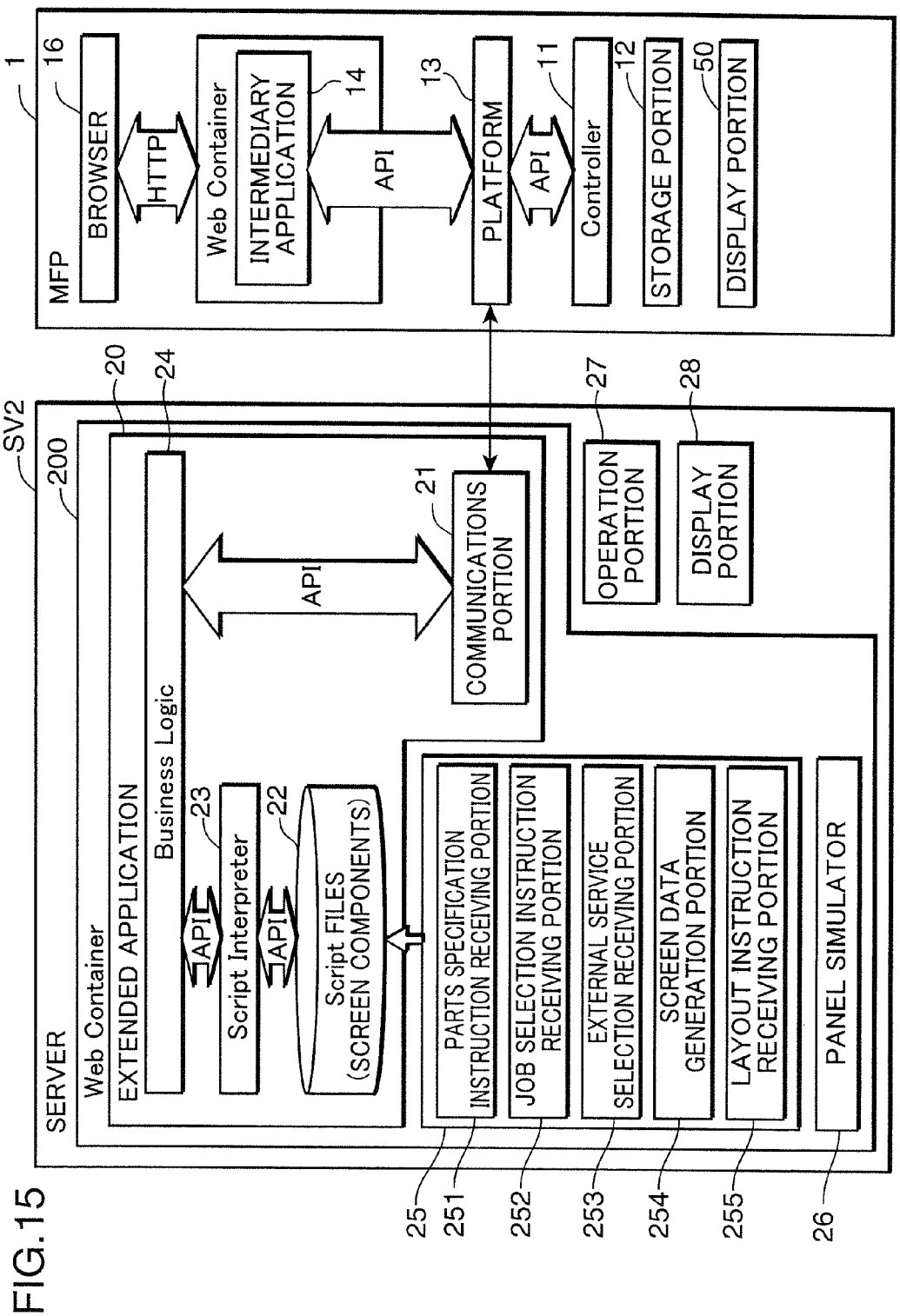
FIG. 15 is a diagram showing a modified example of the operational control system according to the first embodiment.

It should be noted that the present invention is not limited to the configuration of the present embodiment and that various modifications are possible. FIG. 15 is a diagram showing a modified example of the operational control system 10 according to the first embodiment. With the operational control system 10 according to the first embodiment, the WFC portion 3100 of the PC 31 carries out the screen data generation processing, but as shown in FIG. 15, the display screen generation program may be stored in the storage portion of the server computer SV2, and a WFC portion 25 may be provided having a parts specification instruction receiving portion 251, a job selection instruction receiving portion 252, an external service selection receiving portion 253, a layout instruction receiving portion 255, and a screen data generation portion 254 that are equivalent to the foregoing parts selection instruction receiving portion, job selection instruction receiving portion, external service selection instruction receiving portion, layout instruction receiving portion, screen data generation portion, and screen data storage portion of the control unit 200 of the server computer SV2, and the WFC portion 25 may carry out the screen data generation processing. It should be noted that a panel simulator 26 is a tool that analyzes the content of the screen data and the like, which is constituted by the aforementioned script files received from the PC 31, and converts this screen data to HTML format data so as to be displayable by the display portion 28. In this case, the PC 31 is unnecessary, and the server computer SV2 becomes one example of an information processing device within the scope of the claims.

The configurations and processes shown in the foregoing FIGS. 1 to 15 are merely illustrative examples of embodiments of the present invention and do not suggest that the present invention is limited to these embodiments. For example, description was given in regard to the multifunction peripheral 1 or the multifunction peripheral 1' wherein the platform 13 carried out communications with the PC 31 or the server computer SV2, but it is also possible for the multifunction peripheral 1 or the multifunction peripheral 1' to be provided separately from the platform 13, and to have a communications portion that carries out communications with the PC 31 or the server computer SV2 such that this communications portion directs the communications with the PC 31 or the server computer SV2.

Furthermore, the above-described multifunction peripheral 1 and image forming apparatus are merely single examples of an electrical device according to the present invention or constituting the present invention, and electrical devices according to the present invention or constituting the present invention may be another electrical device other than the multifunction peripheral 1 and the image forming apparatus.

In short, the present invention includes an information processing device that generates screen data of a display screen to be displayed on a display portion provided in an electrical device, and is provided with: a parts selection instruction receiving portion that receives from an operator a selection instruction for display object parts to be displayed on a display screen of the display portion for receiving an instruction from an operator, a job selection instruction receiving portion that receives from an operator a selection instruction of a job that is executable by the electrical device and that is associated with the display object parts indicated by the display object parts selection instruction received by the parts selection instruction receiving portion, an external service selection instruction receiving portion that receives from an operator a selection instruction of a service that is executable by an external device other than the electrical device and that is associated with the display object parts indicated by the display object parts selection instruction received by the parts selection instruction receiving portion, and a screen data generation portion that generates screen data of the display screen, on a basis of content determined according to a parts selection instruction received by the parts selection instruction receiving portion, a job selection instruction received by the job selection instruction receiving portion, and a service selection instruction received by the external service selection instruction receiving portion.

Furthermore, the present invention includes a display screen generation program that causes an information processing device to function so as to generate screen data of a display screen to be displayed on a display portion provided in an electrical device, or a computer-readable recording medium on which this display screen generation program is recorded, wherein the display screen generation program causes the information processing device to function as: a parts selection instruction receiving portion that receives from an operator a selection instruction for display object parts to be displayed on a display screen of the display portion for receiving an instruction from an operator, a job selection instruction receiving portion that receives from an operator a selection instruction for a job that is executable by the electrical device and that is associated with the display object parts indicated by the display object parts selection instruction received by the parts selection instruction receiving portion, an external service selection instruction receiving portion that receives from an operator a selection instruction for a service that is executable by an external device other than the electrical device and that is associated with the display object parts indicated by the display object parts selection instruction received by the parts selection instruction receiving portion, and a screen data generation portion that generates screen data of the display screen, on a basis of content determined according to a parts selection instruction received by the parts selection instruction receiving portion, a job selection instruction received by the job selection instruction receiving portion, and a service selection instruction received by the external service selection instruction receiving portion.

With these inventions, if the operations of selecting the display object parts desired by the operator, jobs to be executed on the electrical device, and services to be executed on external devices are carried out by the parts specification instruction receiving portion, the job selection instruction receiving portion, and the external service selection instruction receiving portion respectively, then the screen data generation processing generates the screen data of the display screens using content determined according to the parts selection instruction, the job selection instruction, and the service instruction selection, and therefore the operator can associate jobs of the electrical device and services of the external devices to the display object parts to be executed when the display object parts are operated by the operator without carrying out complicated tasks such as programming or the like. In this way, the generation of operational display screens for executing a workflow in which other peripheral devices other than the electrical device work in cooperation with direct operational control objects by operating the display screens displayed on the display portion can be achieved by simple operations by the operator.

In the conventional image forming apparatuses described in the Description of the Background Art section, operation by the operator based on the display screen on the display portion of that image forming apparatus targets only that image forming apparatus for the operational control based on that operation. However, with the present invention, if the operator carries out operations based on display screens displayed on the display portion of the image forming apparatus, then a workflow can be executed in which other external devices (peripheral devices) other than the image forming apparatus can work in cooperation, and therefore the convenience of the operator is improved.

Furthermore, the present invention is further provided with a layout instruction receiving portion that receives from an operator a layout instruction that instructs arrangement, within the display screen, of the display object parts indicated by the parts selection instruction received by the parts selection instruction receiving portion, wherein the screen data generation portion generates screen data of the display screen, on a basis of content that is set according to a display object parts selection instruction received by the parts selection instruction receiving portion, a job selection instruction received by the job selection instruction receiving portion, a service selection instruction received by the external service selection instruction receiving portion, and a layout instruction received by the layout instruction receiving portion.

With this invention, if the operator uses the layout instruction receiving portion to instruct the arrangement, in the display screens, of display object parts indicating the parts selection instruction, then display screens in which the display object parts associated with jobs of the electrical device and services of the external devices are arranged in desired positions can be generated by simple operations.

Furthermore, the present invention includes a computer-readable recording medium on which an operational control program is recorded, that causes functioning of: a screen data storage portion that stores screen data of a display screen generated, on a basis of content constituted by a display object part displayed in a display portion of the electrical device for receiving an instruction from an operator, a job that is executable by the electrical device and that is associated with the display object part, and a service that is executable by an external device other than the electrical device and that is associated with the display object part, and a response portion that, in accordance with an inquiry, in which the display object part is specified, based on screen data stored in the screen data storage portion, responds with jobs and services associated with the display object part that is an object of that inquiry.

With this invention, in response to the inquiry in which the display object part is specified, the response portion responds with jobs and services associated with the display object parts that are an object of that inquiry based on the display data stored in the display data storage portion, and therefore in a case where the display screen is displayed according to the display object parts as the display screen on the display portion of the electrical device, if the operator operates this display screen, then a workflow can be executed in which other external devices other than the electrical device can work in cooperation, and therefore the convenience of the operator is improved.

Furthermore, the present invention includes an information processing device that manages screen data of a display screen to be displayed on a display portion provided in an electrical device and the electrical device, the information processing device being provided with: A storage portion that stores screen data of a display screen generated, on a basis of content constituted by a display object part displayed in a display screen of the display portion for receiving an instruction from an operator, a job that is executable by the electrical device and that is associated with the display object part, and a service that is executable by an external device other than the electrical device and that is associated with the display object part, a data conversion portion that reads out the screen data of the display screen from the storage portion and converts the screen data into a data format that is displayable on the display portion, a screen data transmission portion that transmits the screen data converted by the data conversion portion to the electrical device as display data, a parts specification instruction receiving portion that receives from the electrical device a parts specification instruction that indicates the display object part specified by an operator of the electrical device, an analysis portion that analyzes jobs and services associated with the display object part indicated by the parts specification instruction received by the parts specification instruction receiving portion, and an output portion that outputs the job analyzed by the analysis portion to the electrical device, and outputs the service analyzed by the analysis portion to an external device that is set a service execution target.

Furthermore, the present invention includes an operational control system provided with the information processing device and the electrical device connected to the information processing device, wherein the electrical device is provided with: the display portion, a receiving portion that receives the display data of the screen data outputted from the output portion of the information processing device, a display control portion that displays on the display portion the display data received by the receiving portion, a parts specification instruction receiving portion that receives from an operator a parts specification instruction that specifies a display object part that is displayed in the display screen when the display data is displayed as a display screen on the display portion by the display control portion, a parts specification instruction output portion that outputs to the information processing device the parts specification instruction received by the parts specification instruction receiving portion, and a control portion that performs operational control of an operational mechanism of the electrical device based on the job received from the information processing device by the receiving portion.

Furthermore, the present invention includes a computer-readable recording medium on which is recorded an operational control program that causes an information processing device to function so as to manage screen data of a display screen to be displayed on a display portion provided in an electrical device and the electrical device, wherein the operational control program causes the information processing device to function as: a storage portion that stores screen data of a display screen generated, on a basis of content constituted by a display object part displayed in a display screen of the display portion for receiving an instruction from an operator, a job that is executable by the electrical device and that is associated with the display object part, and a service that is executable by an external device other than the electrical device and that is associated with the display object part, a data conversion portion that reads out the screen data of the display screen from the storage portion and converts the screen data into a data format that is displayable on the display portion, a screen data transmission portion that transmits the screen data converted by the data conversion portion to the electrical device as display data, a parts specification instruction receiving portion that receives from the electrical device a parts specification instruction that indicates the display object part specified by an operator of the electrical device, an analysis portion that analyzes jobs and services associated with the display object part indicated by the parts specification instruction received by the parts specification instruction receiving portion, and an output portion that outputs the job analyzed by the analysis portion to the electrical device, and outputs the service analyzed by the analysis portion to an external device that is set as a service execution target.

With these inventions, the screen data transmission portion of the information processing device sends to the electrical device the display data, which is screen data of the display screens using content constituted by a display object part, a job that is executable by the electrical device and that is associated with the display object part, and a service that is executable by an external device other than the electrical device and that is associated with the display object part, and is screen data converted by the data conversion portion to a data format that is displayable on the display portion of the electrical device, the analysis portion analyzes jobs and services associated with the display object parts indicated by the parts specification instruction received from the electrical device by the parts specification instruction receiving portion, and the output portion outputs the analyzed job to the electrical device, and outputs the analyzed service to the external device that is set as a service execution target. For this reason, a workflow can be executed in which other peripheral devices other than the electrical device can work in cooperation by performing operation based on the display screens displayed on the display portion of the electrical device such as the image forming apparatus, and the convenience of the operator can be improved.

Further still, in the present invention, the display object parts associated with jobs executable by the electrical device and the display object parts associated with services executable by an external device other than the electrical device are constituted by separate display object parts, the parts specification instruction receiving portion receives from the electrical device the parts specification instructions that specify a display object part associated with the job or service respectively, which are specified by the operator of the electrical device, and the analysis portion analyzes one or both of the job and service associated with the display object part indicated by the parts specification instruction received by the parts specification instruction receiving portion.

With this invention, the display object parts associated with jobs executable by the electrical device and the display object parts associated with services executable by an external device are constituted by separate display object parts, the parts specification instruction receiving portion receives from the electrical device for each display object part the parts specification instructions that specify a display object part associated with the job or service respectively, which are specified by the operator at the electrical device, and the analysis portion analyzes the job or service or both thereof associated with the display object part indicated by the received parts specification. For this reason, for example, it becomes possible for the operator to perform an operation on the display screen displayed on the display portion of the electrical device in which the display object part associated with the desired job and the display object part associated with the desired service on the external device are both selected and these are combined and specified, and there is a wider range of combinations of jobs of the electrical device and services of the external device to be executed in cooperation by operation based on the display screens.

Furthermore, the present invention includes an electrical device, which obtains for display on a display portion display data of a display screen from an information processing device, provided with: the display portion, a display data obtaining portion that obtains from the information processing device display data of the display screen generated, on a basis of content constituted by a display object part displayed in a display screen of the display portion for receiving an instruction from an operator, a job that is executable by the electrical device and that is associated with the display object part, and a service that is executable by an external device other than the electrical device that is associated with the display object part, a data conversion portion that converts the display data obtained by the display data obtaining portion into a data format displayable on the display portion, a display control portion that displays on the display portion the display data converted by the data conversion portion, a parts specification instruction receiving portion that receives from an operator a parts specification instruction that specifies a display object part that is displayed in the display screen when the display data is displayed as a display screen on the display portion by the display control portion, an analysis portion that analyzes jobs and services associated with the display object part indicated by the parts specification instruction received by the parts specification instruction receiving portion, a control portion that performs operational control of an operational mechanism of the electrical device based on the job analyzed by the analysis portion, and an output portion that outputs a service analyzed by the analysis portion to an external device that is set as a service execution target.

Furthermore, the present invention includes an operational control system comprising an information processing device that generates screen data of display screens to be displayed on the display portion provided in an electrical device, and the electrical device connected to the information processing device, wherein the information processing device is provided with: a screen data generation portion that generates screen data of the display screens, on a basis of content constituted by a display object part displayed in a display screen of the display portion of the electrical device, a job that is executable by the electrical device and that is associated with the display object part, and a service that is executable by an external device other than the electrical device and that is associated with the display object part, and a screen data output portion that outputs the screen data generated by the screen data generation portion to the electrical device as display data, and the electrical device is provided with: the display portion, a display data obtaining portion that obtains from the information processing device display data of the display screen generated, on a basis of content constituted by a display object part displayed in a display screen of the display portion for receiving an instruction from an operator, a job that is executable by the electrical device and that is associated with the display object part, and a service that is executable by an external device other than the electrical device and that is associated with the display object part, a data conversion portion that converts the screen data obtained by the display data obtaining portion into a data format displayable on the display portion, a display control portion that displays on the display portion the display data converted by the data conversion portion, a parts specification instruction receiving portion that receives from an operator a parts specification instruction that specifies a display object part that is displayed in the display screen when the display data is displayed as a display screen on the display portion by the display control portion, an analysis portion that analyzes jobs and services associated with the display object part indicated by the parts specification instruction received by the parts specification instruction receiving portion, a control portion that performs operational control of an operational mechanism of the electrical device based on the job analyzed by the analysis portion, and an output portion that outputs a service analyzed by the analysis portion to an external device that is set as a service execution target.

Furthermore, the present invention includes a computer-readable recording medium on which is recorded an operational control program that causes a control portion in an electrical device to function so as to display on a display portion of the electrical device display data of a display screen obtained from an information processing device, wherein the operational control program causes the control portion in the electrical device to function as: a display data obtaining portion that obtains from the information processing device display data of the display screen generated, on a basis of content constituted by a display object part displayed in a display screen of the display portion for receiving an instruction from an operator, a job that is executable by the electrical device and that is associated with the display object part, and a service that is executable by an external device other than the electrical device and that is associated with the display object part, a data conversion portion that converts the display data obtained by the display data obtaining portion into a data format displayable on the display portion, a display control portion that displays on the display portion the display data converted by the data conversion portion, a parts specification instruction receiving portion that receives from an operator a parts specification instruction that specifies a display object part that is displayed in the display screen when the display data is displayed as a display screen on the display portion by the display control portion, an analysis portion that analyzes jobs and services associated with the display object part indicated by the parts specification instruction received by the parts specification instruction receiving portion, a control portion that performs operational control of an operational mechanism of the electrical device based on the job analyzed by the analysis portion, and an output portion that outputs a service analyzed by the analysis portion to an external device that is set as a service execution target.

With these inventions, display control portion of the electrical device displays on the display portion the display data of display screens generated using content constituted by a display object part, a job that is executable by the electrical device and that is associated with the display object part, and a service that is executable by an external device other than the electrical device and that is associated with the display object part, the analysis portion analyzes jobs and services associated with the display object parts indicated by the parts specification instruction received by the parts specification instruction receiving portion from among the display object parts that are displayed, and the control portion performs operational control on the operational mechanisms of the electrical device based on the analyzed job, and the output portion outputs the analyzed service to the external device that is set as the service execution target. For this reason, a workflow can be executed in which other peripheral devices other than the electrical device can work in cooperation by performing operation based on the display screens displayed on the display portion of the electrical device such as the image forming apparatus, and the convenience of the operator can be improved.

Further still, in the present invention, the parts specification instruction receiving portion receives parts specification instructions from an operator separately with regard to the display object parts associated with jobs executable by the electrical device and the display object parts associated with services executable by an external device other than the electrical device, and the analysis portion analyzes one or both of the job and service associated with the display object part indicated by the parts specification instruction received by the parts specification instruction receiving portion.

With this invention, in regard to the separate display object parts associated with jobs executable by the electrical device and the display object parts associated with services executable by an external device other than the electrical device, the parts specification instruction receiving portion receives for each of the display object parts the parts specification instruction that specifies a display object part associated with the job or service respectively, which are specified by the operator at the electrical device, and the analysis portion analyzes the job or service or both thereof associated with the display object part indicated by the received parts specification. For this reason, for example, it becomes possible for the operator to perform an operation on the display screen displayed on the display portion of the electrical device in which the display object part associated with the desired job and the display object part associated with the desired service on the external device are both selected and these are combined and specified, and there is a wider range of combinations of jobs of the electrical device and services of the external device to be executed in cooperation by operation based on the display screens.

This application is based on Japanese Patent application serial Nos. 2009-250936, 2009-250937 and 2009-250938 filed in Japan Patent Office on Oct. 30, 2009, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An operational control system having an electrical device, an external device other than the electrical device, a first information processing device that generates screen data of a display screen to be displayed on a display portion provided in the electrical device and a second information processing device that manages screen data of the display screen and the electrical device, wherein the electrical device, the external device, the first information processing device and the second information processing device are connected by a network, wherein
the first information processing device comprises:
a parts selection instruction receiving portion that receives from an operator a selection instruction for display object parts to be displayed on a display screen of the display portion for receiving an instruction from the operator,
a job selection instruction receiving portion that receives from the operator a selection instruction of a job that is executable by the electrical device and that is associated with the display object parts indicated by the display object parts selection instruction received by the parts selection instruction receiving portion,
an external service selection instruction receiving portion that receives from the operator a selection instruction of a service that is executable by the external device and that is associated with the display object parts indicated by the display object parts selection instruction received by the parts selection instruction receiving portion, and
a screen data generation portion that generates screen data of the display screen provided with the display object parts for inputting instruction by which a job by the electrical device and a service by the external device are carried out in cooperation on a basis of content determined according to a parts selection instruction received by the parts selection instruction receiving portion, a job selection instruction received by the job selection instruction receiving portion, and a service selection instruction received by the external service selection instruction receiving portion,
the second information processing device comprises:
a storage portion that stores screen data of the display screen generated by the screen data generation portion,
a data conversion portion that reads out the screen data of the display screen from the storage portion and converts the screen data into a data format that is displayable on the display portion, a screen data transmission portion that transmits the screen data converted by the data conversion portion to the electrical device as display data,
a parts specification instruction receiving portion that receives from the electrical device a parts specification instruction that indicates the display object part specified by the operator of the electrical device, an analysis portion that analyzes jobs and services associated with the display object part indicated by the parts specification instruction received by the parts specification instruction receiving portion, and an output portion that outputs the job analyzed by the analysis portion to the electrical device, and outputs the service analyzed by the analysis portion to the external device that is set as a service execution target, the electrical device comprises:

the display portion, a receiving portion that receives display data of the screen data transmitted from the screen data transmission portion of the second information processing device, a display control portion that displays on the display portion the display data received by the receiving portion, a parts specification instruction receiving portion that receives from an operator a parts specification instruction that specifies a display object part that is displayed in the display screen when the display data is displayed as a display screen on the display portion by the display control portion, a parts specification instruction output portion that outputs to the information processing device the parts specification instruction received by the parts specification instruction receiving portion, and a control portion that performs operational control of an operational mechanism of the electrical device based on the job output from the output portion of the second information processing device, wherein the external device executes the service output from the output portion of the second information processing device.

* * * * *